(12) United States Patent
Zeh et al.

(10) Patent No.: US 12,378,996 B2
(45) Date of Patent: Aug. 5, 2025

(54) PLAIN BEARING ARRANGEMENT AND NACELLE EQUIPPED WITH A PLAIN BEARING ARRANGEMENT FOR A WIND TURBINE

(71) Applicant: Miba Gleitlager Austria GmbH, Laakirchen (AT)

(72) Inventors: Christopher Zeh, Obernfeld (DE); Patrick Laubichler, Gmunden (AT); Albert Waldl, Laakirchen (AT); Johannes Hoelzl, Berg im Attergau (AT)

(73) Assignee: Miba Gleitlager Austria GmbH, Laakirchen (AT)

( * ) Notice: Subject to any disclaimer, the term of this patent is extended or adjusted under 35 U.S.C. 154(b) by 125 days.

(21) Appl. No.: 18/039,021

(22) PCT Filed: Nov. 29, 2021

(86) PCT No.: PCT/AT2021/060451
§ 371 (c)(1),
(2) Date: Jun. 6, 2023

(87) PCT Pub. No.: WO2022/109648
PCT Pub. Date: Jun. 2, 2022

(65) Prior Publication Data
US 2024/0011527 A1    Jan. 11, 2024

(30) Foreign Application Priority Data

Nov. 30, 2020  (AT) .............................. A 51044/2020
Apr. 8, 2021   (AT) .............................. A 50259/2021

(51) Int. Cl.
*F16C 33/10*    (2006.01)
*F03D 80/50*    (2016.01)
(Continued)

(52) U.S. Cl.
CPC ............ *F16C 33/108* (2013.01); *F03D 80/50* (2016.05); *F16C 23/045* (2013.01); *F16C 35/02* (2013.01); *F16C 43/02* (2013.01); *F16C 2360/31* (2013.01)

(58) Field of Classification Search
CPC .... F16C 17/105; F16C 23/043; F16C 23/045; F16C 23/046; F16C 33/043; F16C 33/108; F16C 33/26; F16C 35/02; F16C 43/02
See application file for complete search history.

(56) References Cited

U.S. PATENT DOCUMENTS

| 2,312,648 A | 3/1943 | Jones |
| 3,395,951 A | 8/1968 | Barr et al. |

(Continued)

FOREIGN PATENT DOCUMENTS

| AU | 2016201226 A1 | 3/2017 |
| CN | 106870558 A | 6/2017 |

(Continued)

OTHER PUBLICATIONS

International Search Report in PCT/AT2021/060451, mailed Jan. 28, 2022.

*Primary Examiner* — James Pilkington
(74) *Attorney, Agent, or Firm* — Collard & Roe, P.C.

(57) ABSTRACT

A slide bearing arrangement includes an inner ring element, an outer ring element, and at least one slide bearing element, which is arranged between the inner ring element and the outer ring element. The slide bearing element includes at least two slide bearing pads, wherein the individual slide bearing pads each have a bearing surface that is cambered, viewed in an axial direction, and wherein an apex of the bearing surface has the largest diameter of the bearing surface.

25 Claims, 17 Drawing Sheets

(51) Int. Cl.
*F16C 23/04* (2006.01)
*F16C 35/02* (2006.01)
*F16C 43/02* (2006.01)

(56) References Cited

U.S. PATENT DOCUMENTS

| | | |
|---|---|---|
| 9,458,880 B2 | 10/2016 | Kari et al. |
| 11,085,523 B2 | 8/2021 | Nique et al. |
| 11,486,446 B2 | 11/2022 | Hoelzl et al. |
| 12,012,941 B2 * | 6/2024 | Holzinger ............... F16C 43/02 |
| 2012/0057814 A1 | 3/2012 | Dadson et al. |
| 2019/0368544 A1 | 12/2019 | Julliand et al. |
| 2022/0145862 A1 | 5/2022 | Holzinger et al. |

FOREIGN PATENT DOCUMENTS

| | | | |
|---|---|---|---|
| DE | 531 749 C | 8/1931 | |
| DE | 650 737 C | 9/1937 | |
| DE | 678 930 C | 7/1939 | |
| EP | 3 252 306 A1 | 8/2014 | |
| EP | 3 260 715 A1 | 12/2017 | |
| EP | 3 301 315 A1 | 4/2018 | |
| EP | 3 489 548 A1 | 5/2019 | |
| EP | 3 149 348 B1 | 7/2020 | |
| FR | 1 464 065 A | 7/1966 | |
| FR | 2 786 544 A1 | 6/2000 | |
| GB | 486 220 A | 6/1938 | |
| GB | 1 224 496 A | 3/1971 | |
| WO | 2011/127510 A1 | 10/2011 | |
| WO | WO-2013042294 A1 * | 3/2013 | ............. F03D 13/10 |
| WO | 2015/110138 A1 | 7/2015 | |
| WO | 2015/184022 A1 | 12/2015 | |
| WO | 2016/076682 A2 | 5/2016 | |
| WO | 2020/118336 A1 | 6/2020 | |
| WO | 2020/176918 A1 | 9/2020 | |
| WO | 2020/176919 A1 | 9/2020 | |

* cited by examiner

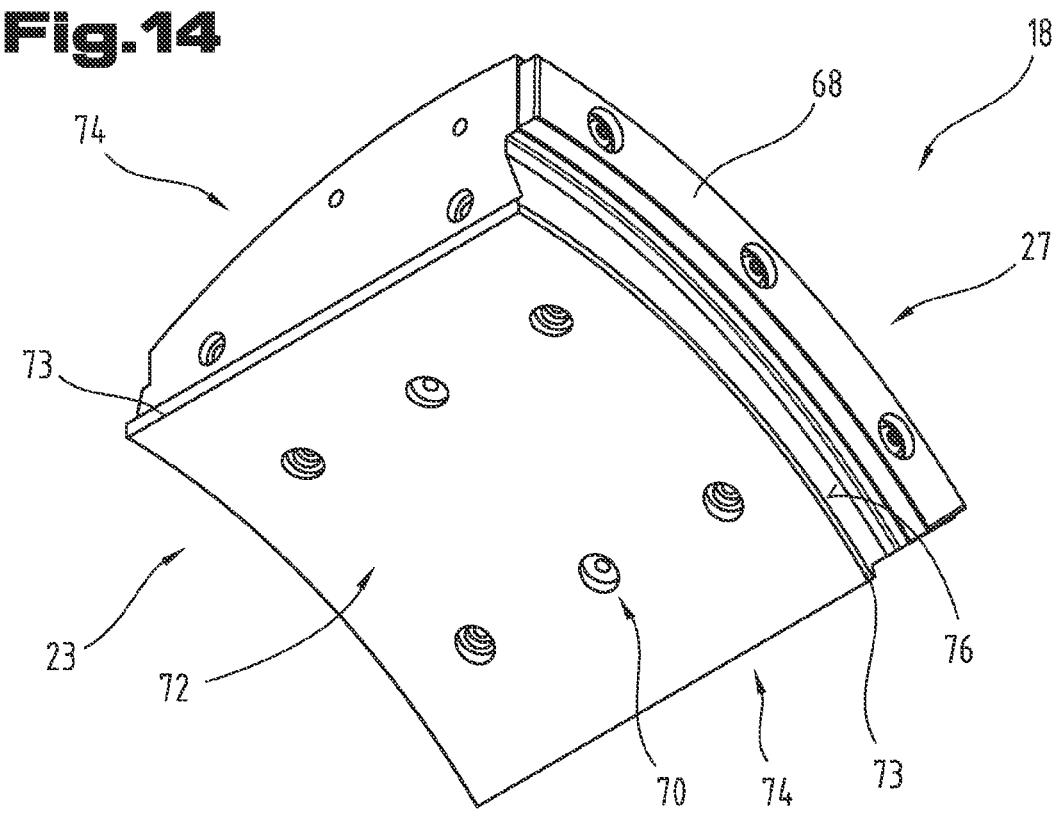
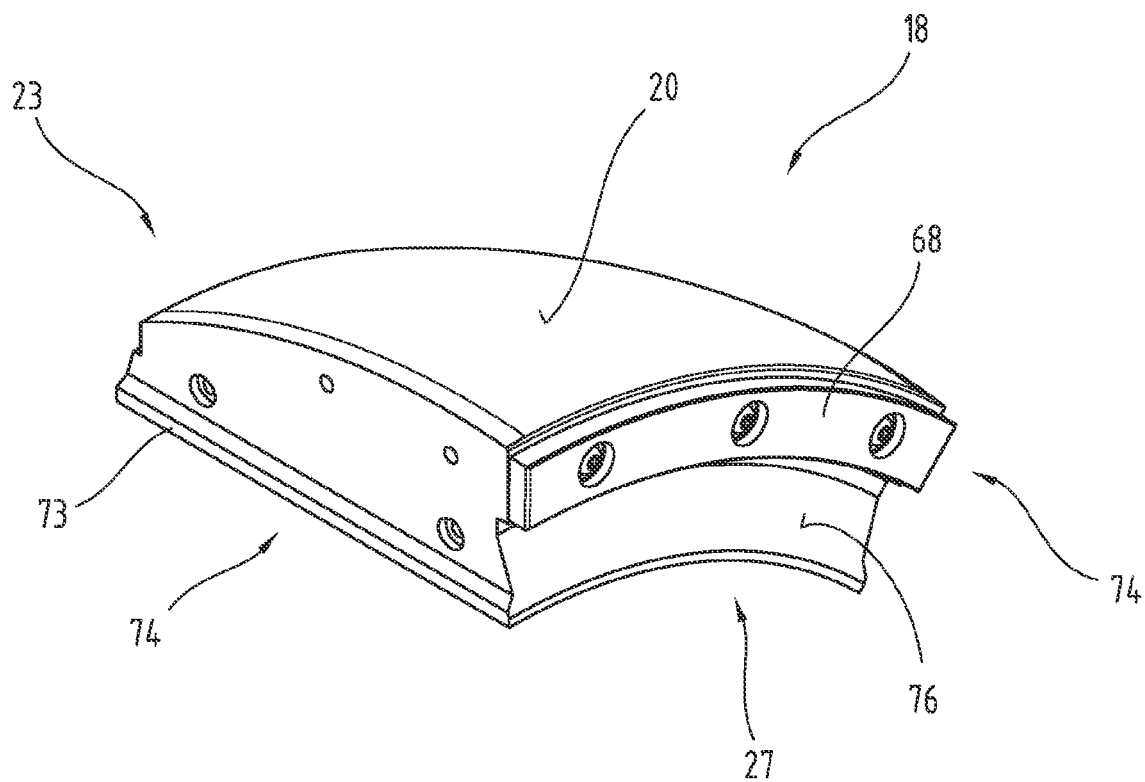

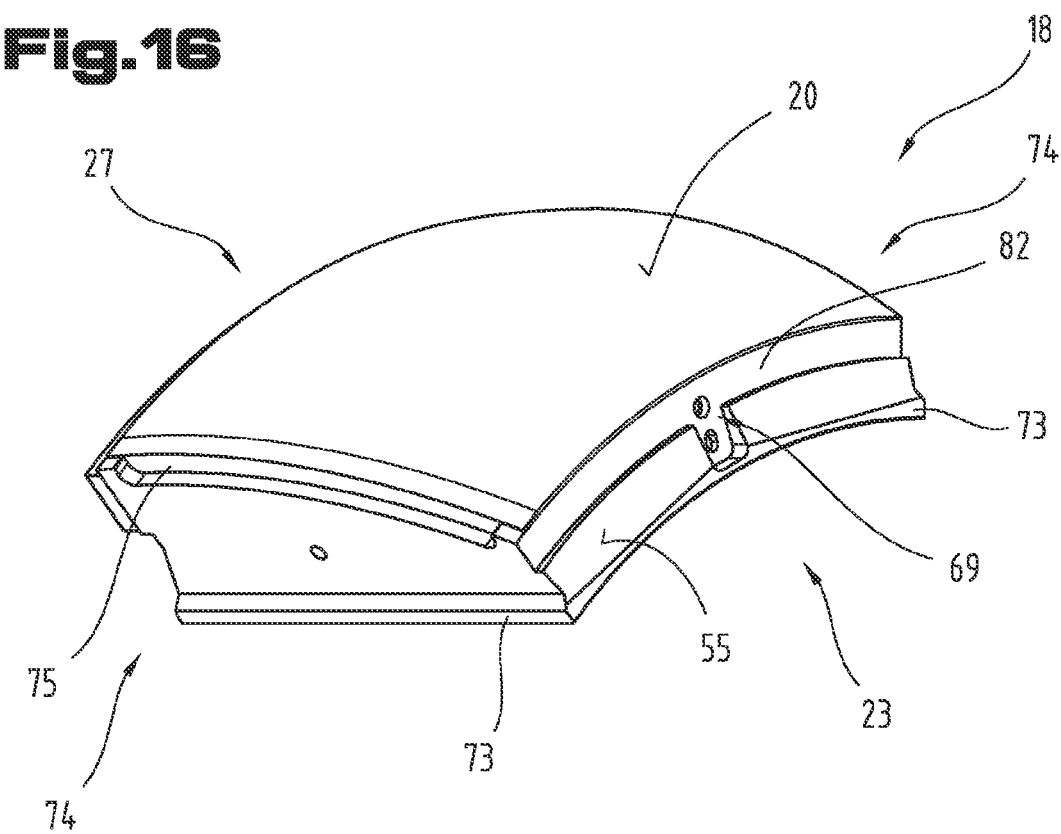

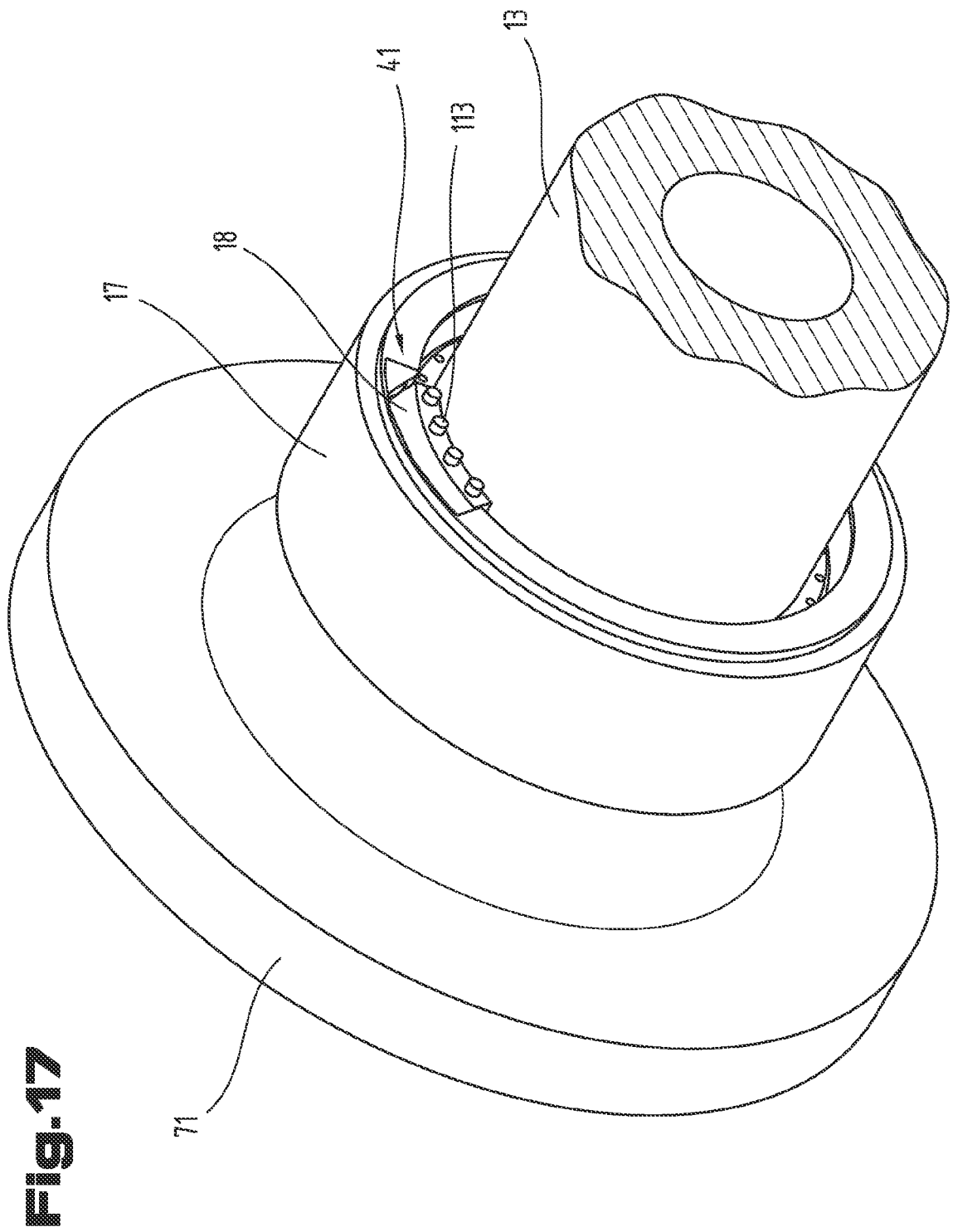

PLAIN BEARING ARRANGEMENT AND NACELLE EQUIPPED WITH A PLAIN BEARING ARRANGEMENT FOR A WIND TURBINE

CROSS REFERENCE TO RELATED APPLICATIONS

This application is the National Stage of PCT/AT2021/060451 filed on Nov. 29, 2021, which claims priority under 35 U.S.C. § 119 of Austrian Application No. A51044/2020 filed on Nov. 30, 2020 and Austrian Application No. A50259/2021 filed on Apr. 8, 2021, the disclosures of which are incorporated by reference. The international application under PCT article 21(2) was not published in English.

BACKGROUND OF THE INVENTION

1. Field of the Invention

The invention relates to a slide bearing arrangement, and a nacelle equipped with the slide bearing arrangement for a wind turbine, and a wind turbine.

2. Description of the Related Art

A bearing element for mounting the rotor hub of a wind turbine is known from WO 2011/127510 A1.

SUMMARY OF THE INVENTION

It was the object of the present invention to make available an improved slide bearing arrangement.

This object is achieved by means of a device in accordance with the claims.

In accordance with the invention, a slide bearing arrangement is configured. The slide bearing arrangement comprises:
 an inner ring element;
 an outer ring element;
 at least one slide bearing element, which is arranged between the inner ring element and the outer ring element,
 wherein a bearing surface of the slide bearing element and a mating surface of the outer ring element rest against each other,
 wherein the slide bearing element comprises at least two slide bearing pads, wherein the individual slide bearing pads each have a bearing surface that is cambered, viewed in an axial direction.

In particular, it can be provided that the bearing surface is cambered outward. In other words, the bearing surface can be configured so as to be convex.

The slide bearing arrangement in accordance with the invention has the advantage that, due to the structure in accordance with the invention, it is configured both to receive axial forces and to receive radial forces.

It can further be provided that an apex of the bearing surface has the greatest radial distance of the bearing surface to an axis of rotation.

Further, it can be expedient if the individual slide bearing pads have the basic form of a spherical cap with a spherical cap radius in a spherical cap section and have a transition radius in a transition section.

In a first embodiment variant, it can be provided that the transition radius is smaller than the spherical cap radius. This results in the advantage that the spherical cap section can be configured to receive the radial forces and/or the axial forces acting in a first direction. The transition section can be configured to receive axial forces acting in a second direction. Here, the axial forces acting in the first direction can be greater than the axial forces acting in the second direction.

It can further be provided that the transition radius and the spherical cap radius have the same size.

Further, it can be provided that the spherical cap section extends up to an apex and the transition section adjoins the spherical cap section at the apex. A slide bearing thus configured has a surprisingly long lifetime.

Furthermore, it can be provided that the transition section transitions tangentially to the spherical cap section. Particularly a slide bearing thus configured has surprisingly good sliding properties.

Also advantageous is an embodiment, in accordance with which it can be provided that the slide bearing pad has a first axial end and a second axial end and that the apex is arranged at a distance from the second axial end of the slide bearing pad, wherein the distance is between 1% and 49%, in particular between 5% and 35%, preferably between 10% and 25%, of an axial extension of the slide bearing pad. Particularly in a slide bearing arrangement thus designed, strong radial forces and/or strong axial forces can be absorbed in a first direction.

In accordance with one advancement, it is possible that a removal opening is configured in the outer ring element, which removal opening interrupts the mating surface of the outer ring element, starting from a first axial end of the outer ring element. This results in the advantage that, due to this measure, the individual slide bearing pads are simple to change, without the complete slide bearing arrangement having to be dismantled into its parts to that end. In particular, it is conceivable that it is achieved with this measure that the individual slide bearing pads can be changed in the integrated state of the slide bearing arrangement without the slide bearing arrangement having to be completely dismantled. It can further be provided that the removal opening extends from a first axial end of the outer ring element at least up to the apex of the slide bearing element.

Further, it is conceivable that, in the operating mode of the slide bearing, a porous material, such as a sponge, for example, is arranged in the removal opening, which porous material serves to temporarily receive lubricating oil. With this measure, it can be achieved that the sliding surface of the individual slide bearing pads is evenly covered with a lubricating oil film.

In one advancement, it can be provided that a sensor system is arranged in the removal opening, which sensor system serves to acquire operating modes and/or wear states of the slide bearing. Such a sensor system may be, for example, a temperature sensor, an oscillation sensor or suchlike.

The individual slide bearing pads are simple to remove from their operating position through the removal opening.

Further, it may be expedient if the removal opening has a circumferential extension and that the slide bearing pads each have a circumferential extension, wherein the circumferential extension of the slide bearing pads is between 60% and 99.9%, in particular between 80% and 99%, preferably between 90% and 98%, of the circumferential extension of the removal opening. Particularly with such a size ratio, the removal opening has a sufficient circumferential extension to enable the individual slide bearing pads to be taken out of the slide bearing arrangement in a simple manner through the removal opening. At the same time, the removal opening is sufficiently small so as not to cause a weakening of the outer ring element and/or a reduction of the load-bearing capacity of the slide bearing arrangement.

Furthermore, it can be provided that the removal opening is configured so as to widen radially towards the first axial end. This results in the advantage that the outer ring element can have a stability that is as high as possible and, at the same time, the slide bearing pad is as simple as possible to remove through the removal opening.

Further, it can be provided that a slide bearing pad reception ring is configured, which serves to affix the slide bearing pads, wherein the slide bearing pad reception ring is received on the inner ring element. This results in the advantage that, through this measure, the slide bearing pads can be firmly coupled with the inner ring element.

Furthermore, it can be provided that the slide bearing pad reception ring is shrunk onto the inner ring element. Particularly for rotor shafts, this is a highly sustainable and feasible bond. In the shrinking-on process, the slide bearing pad reception ring is heated and/or the inner ring element is cooled down in order to facilitate an axial forcing-on. After the temperature equalization, and therefore the equalization of the respective thermal expansions, a tight fit of the slide bearing pad reception ring on the inner ring element can be achieved.

In an alternative embodiment variant, or additionally, it can be provided that the slide bearing pad reception ring is coupled with the inner ring element by means of a material bond, such as a welded bond, for example.

In yet another embodiment variant, it can be provided that the slide bearing pad reception ring is coupled with the inner ring element by means of an interlocking bond, such as a screwed bond, for example.

It can further be provided that multiple tapped holes are configured in the slide bearing pad reception ring, which tapped holes are arranged in an axial direction of the slide bearing pad reception ring and serve to receive fastening screws, wherein pass-through holes are configured in the slide bearing pads, through which pass-through holes the fastening screws are plugged in order to clamp the slide bearing pads on the slide bearing pad reception ring by means of the fastening screws. Such a bond between the slide bearing pads and the slide bearing pad reception ring is simple to produce.

In one advancement, it can be provided that the slide bearing pads have a shoulder on their inner face, which shoulder rests against an axial end of the slide bearing pad reception ring, wherein the pass-through holes are arranged in the region of the shoulder. With this measure, a sufficiently load-bearing connection between the slide bearing pad and the inner ring is achieved.

It can further be provided that a shaft nut is configured, which has an axial securing element reception, wherein at least one axial securing element per slide bearing pad is received in the axial securing element reception, which axial securing element serves to fix the slide bearing pad axially. This results in the advantage that the individual slide bearing pads can be fixed in their position by means of the axial securing elements. Furthermore, the shaft nut is simple to adjust in its axial position and can provide sufficient support for the individual axial securing elements.

In an alternative embodiment variant, it can also be provided that, instead of the shaft nut, a shaft ring, which can be forced on, for example, can serve to receive the axial securing elements.

In yet another embodiment variant, instead of the shaft nut, the rotor shaft itself can serve to receive the axial securing elements and have a corresponding shape.

In accordance with one particular embodiment, it is possible that the axial securing element is coupled with the shaft nut by means of a fastening screw acting in a radial direction, wherein the axial securing element, on at least one axial end, has a wedge surface that tapers off towards the axis of rotation, which wedge surface corresponds with a first mating wedge surface, which is arranged on a first axial end of the slide bearing pad. This measure ensures that the axial securing element can exert an axial pressure on the slide bearing pad by tightening the fastening screw, whereby the slide bearing pad can be clamped by means of the axial securing element.

It can further be provided that the wedge surface of the axial securing element, which wedge surface tapers off towards the axis of rotation, corresponds with a first mating wedge surface configured on the first axial end of the slide bearing element. This measure enables the slide bearing pad not only to be clamped axially but also to be clamped radially. Furthermore, the tapering-off shape of the wedge surface and the corresponding mating shape of the first mating wedge surface enable an interlocking bond between the axial securing element and the slide bearing pad to be achieved. In particular, it can be provided that the first mating wedge surface is configured such that the slide bearing pad has a wide base on its inner face and tapers off outwardly in the region of the first mating wedge surface.

In accordance with one advantageous advancement, it can be provided that the shaft nut has a rotation surface for a shaft sealing ring on its outer face. This results in the advantage that the shaft nut can simultaneously serve as mating component for the shaft sealing ring. Furthermore, the surface properties of the rotation surface required for a shaft sealing ring, for example a surface that is ground twist-free, are simpler to produce on the shaft nut than on a rotor shaft, for example. This enables the structure of the slide bearing arrangement to be simplified and the lifetime of the slide bearing arrangement to be improved.

In particular, it can be advantageous if a bearing block is configured, in which the outer ring element is received, wherein a cover is configured at least at an axial front end of the bearing block, wherein a lubricating oil reservoir is configured so as to be integrated in the cover or adjoined to the cover. This has the advantage that, in a lubricating oil reservoir thus configured, a sufficient quantity of lubricating oil for a hydrodynamic slide bearing can be stocked up.

Further, it can be provided that an axial stop ring is configured. It can further be provided that at least one antitwist protection element is configured, which acts between the axial stop ring and at least one of the slide bearing pads. With this measure, it can be achieved that at least one of the slide bearing pads is secured against twisting relative to a shaft.

It can further be provided that the axial stop ring has a wedge surface, which is configured such that an interlocking bond between the slide bearing pad and the axial stop ring can be achieved. In particular, it can be provided that a second mating wedge surface is configured on the second axial end of the slide bearing pad. In particular, it can be provided that the second mating wedge surface is configured such that the slide bearing pad has a wide base on its inner face and tapers off outwardly in the region of the second mating wedge surface.

Due to the first mating wedge surface and the second mating wedge surface, in case of an axial clamping of the slide bearing pad, an additional radial clamping of the slide bearing pad and/or a radial pressing of the slide bearing pad against the rotor shaft can be achieved by bringing wedge surfaces in contact with the mating wedge surfaces. This can in particular be achieved by means of the interlocking bond of the wedge surfaces with the respective mating wedge surfaces.

It can further be provided that a separate antitwist protection element is configured for each of the slide bearing pads.

It can further be provided that the axial stop ring is shrunk onto the shaft.

Furthermore, it can be provided that the axial stop ring has a rotation surface for a shaft sealing ring on its outer face. This results in the advantage that the shaft nut can simultaneously serve as mating component for the shaft sealing ring. Furthermore, the surface properties of the rotation surface required for a shaft sealing ring, for example a surface that is ground twist-free, are simpler to produce on the axial stop ring than on a rotor shaft, for example. This enables the structure of the slide bearing arrangement to be simplified and the lifetime of the slide bearing arrangement to be improved.

Also advantageous is an embodiment, in accordance with which it can be provided that the removal opening, in a circumferential direction, has an oil feed, in particular a rounding or a chamfer, which is larger than 5 mm, preferably larger than 10 mm, in particular larger than 20 mm. This results in the advantage that lubricating oil that adheres to the slide bearing pad, in particular to the bearing surface, is not scraped off by the removal opening but remains on the bearing surface.

It can further be provided that a form element, in particular a thread, is configured on the first axial end of the slide bearing pad, which form element serves to receive a connection element. This results in the advantage that the slide bearing pad can thus be coupled with a slide bearing pad changing device in a simplified manner.

It can further be provided that a thrust ring segment is arranged on a second axial end of the slide bearing pad. This results in the advantage that the spherical cap section can be configured to receive the radial forces and/or the axial forces acting in a first direction. The thrust ring segment can be configured to receive axial forces acting in a second direction. Here, the axial forces acting in the first direction can be greater than the axial forces acting in the second direction. In particular, it can be provided that the thrust ring segment has a sliding surface, which interacts with a corresponding mating sliding surface of the outer ring element.

In a first embodiment variant, it can be provided that the thrust ring segment is coupled with the slide bearing pad by means of fastening means, in particular by means of screws. In particular, it can be provided that the thrust ring segment is coupled with the slide bearing pad by means of at least two fastening means, preferably by means of three fastening means, in particular by means of Allen screws. Here, the fastening means can be divided up at an identical angular distance.

In another embodiment variant, it can be provided that the thrust ring segment is configured so as to be integrally formed, or formed as one piece, with the slide bearing pad.

It can further be provided that, spacers are arranged between the individual slide bearing pads, viewed in a circumferential direction. This results in the advantage that the slide bearing pads can be retained in position.

In one advancement, it can be provided that the spacers are configured so as to be arranged directly on the slide bearing pads. In an alternative embodiment variant, it can be provided that the spacers are configured as independent components, which are arranged between the slide bearing pads.

Furthermore, it can be provided that a lubricating oil transport groove is configured in the region of the bearing surface on a first circumferential face of the slide bearing pad. Such a lubricating oil transport groove has the advantage that the lubricating oil can be conveyed upwards from the lubricating oil reservoir by means of the lubricating oil transport groove and can therefore be distributed across the mating surface of the outer ring element.

Further, it can be provided that a reception for a lifting device is configured in the slide bearing pad, on its inner face. This can facilitate the initial assembly of the slide bearing pads.

In accordance with the invention, a method for changing a slide bearing pad of a slide bearing arrangement is provided. The method comprises the method steps:
  moving the slide bearing pad to be changed to a removal opening configured in the outer ring element;
  releasing the axial securing element of the slide bearing pad to be changed;
  axially removing the slide bearing pad to be changed through the removal opening;
  axially inserting a new slide bearing pad through the removal opening;
  fixing the new slide bearing pad by means of the axial securing element.

The method in accordance with the invention results in the advantage that the individual slide bearing pads can be changed even in the assembled state of the slide bearing arrangement. This enables the maintenance process to be simplified substantially.

In accordance with the invention, a nacelle for a wind turbine is provided. The nacelle comprises:
  a nacelle housing;
  a rotor shaft;
  a rotor hub, which is arranged on the rotor shaft;
  a rotor bearing arrangement for mounting the rotor shaft on the nacelle housing. The rotor bearing arrangement comprises a slide bearing arrangement, which is configured according to any one of the above embodiments.

Particularly in nacelles of wind turbines, the slide bearing in accordance with the invention is of advantage due to its ease of maintenance.

In accordance with one particular embodiment, it is possible that the rotor bearing arrangement comprises a bearing block, in which the outer ring element is received, wherein the bearing block has an axial stop for the outer ring element, wherein the axial stop is configured at an axial front end of the bearing block facing away from the rotor hub. This has the advantage that the axial stop acts in a main load direction of the rotor bearing arrangement.

In accordance with one advantageous advancement, it can be provided that a removal opening is configured in the outer ring element, which removal opening extends from a first axial end of the outer ring element at least up to the apex of the slide bearing element, wherein the removal opening is configured on the end of the bearing block facing away from the rotor hub. This results in the advantage that the individual slide bearing pads can be removed in a simple manner in the assembled state of the nacelle in order to change the individual slide bearing pads.

In particular, it can be advantageous if the axial stop has a recess in the region of the removal opening of the outer ring element, which recess corresponds with the removal opening. This results in the advantage that the individual slide bearing pads can be fitted and/or removed in a simple manner.

In an alternative embodiment variant, it can be provided that the outer ring element is configured so as to be formed as one piece, or integrally, with the bearing block. In other words, it can be provided that the bearing block can simultaneously serve as outer ring element. All features which are described for the outer ring element, such as the removal opening, for example, can therefore also be configured directly in the bearing block.

The bearing block can have a bearing block base and a bearing block cover. This results in the advantage that the bearing block cover is simple to remove, whereby a simplified removal of the slide bearing pads in case of maintenance can be achieved. In particular, this measure enables the slide bearing pads to be removed radially from the inner ring element. Furthermore, this measure enables the individual slide bearing pads to be arranged on the inner ring element in a simplified manner upon assembly of the slide bearing arrangement by lifting the individual slide bearing pads radially through the opening of the bearing block cover in the space between the inner ring element and the outer ring element. In particular, it can be provided that, during operation of the slide bearing arrangement, the outer ring element is stationary and that the slide bearing pads are affixed to the inner ring element and are rotated together with the inner ring element.

Further, it can be provided that the bearing surface interacts with the outer ring element, wherein a mating surface of the bearing surface is configured in the outer ring element. This results in the advantage that the sliding surface and/or also the mating surface can be manufactured in a simple manner.

It can further be provided that an antitwist protection is configured on at least one of the slide bearing pads, by means of which antitwist protection this slide bearing pad is secured against twisting relative to the inner ring. Such an antitwist protection can be, for example, an elevation, a depression or also another element acting in an interlocking manner between the slide bearing pad and the inner ring element, such as a pulling pin, for example.

In accordance with one advancement, it is possible that at least individual of the slide bearing pads are coupled with one another by means of a connection element. This results in the advantage that the individual slide bearing pads can be fixed relative to one another. Therefore, the position of the individual slide bearing pads can be fixed.

Further, it can be provided that the outer ring element has a recess and/or a reinforcement, which serves to change a position of a shear center of the outer ring element. This results in the advantage that the deforming of the outer ring element, which is caused by the force acting on the slide bearing arrangement, can be influenced. Therefore, this measure enables the surface pressure, which is caused by the stress, to be reduced and/or displaced.

Furthermore, it can be provided that the mating surface of the outer ring element and/or the bearing surfaces of the slide bearing pads have a shape diverging from an ideal spherical cap by between 0.001 mm and 10 mm, in particular between 0.5 mm and 5 mm, preferably between 0.5 mm and 1 mm, which shape is configured such that stress-related deformations of the inner ring element and/or of the outer ring element and/or of the slide bearing pad are equalized and, in the load-bearing state, the bearing surfaces of the slide bearing pads rest flatly against the mating surface of the outer ring element. This results in the advantage that, through this measure, a stress-related deforming of individual components of the slide bearing arrangement can be anticipated, so that the bearing surface and the mating surface rest against each other as flatly as possible during operation in order to avoid the surface pressure.

In an alternative embodiment variant, it can be provided that the inner ring element is configured so as to be formed as one piece, or integrally, with the rotor shaft. In other words, it can be provided that the rotor shaft can simultaneously serve as inner ring element. All features which are described for the inner ring element can therefore also be configured directly in the rotor shaft.

Also advantageous is an embodiment, in accordance with which it can be provided that that the slide bearing arrangement is configured as a hydrodynamic slide bearing arrangement. Particularly a hydrodynamic slide bearing arrangement has a low frictional resistance and therefore a high efficiency.

The apex in accordance with this document is the point that has the largest diameter of the bearing surface, viewed in the longitudinal section of the slide bearing pad. This point is guided around the axis of rotation with rotational symmetry and therefore forms an envelope and/or envelope line, viewed over the entire slide bearing pad.

Further, it is conceivable that a slide coating is arranged on one of the surfaces of the rotor shaft and/or of the bearing block and/or of the outer ring element and/or of the slide bearing pads. The slide coating can be produced by means of an additive manufacturing method. In particular, it is conceivable that the slide bearing coating is produced by one of the following methods: metal wire transfer, electron-beam welding, friction welding, laser deposition welding, 3D metal print, direct energy deposition, binder jetting, material jetting, cold gas spraying, selective laser melting, material extrusion, direct metal laser sintering, direct metal laser melting, cold metal transfer, metal inert gas (MIG) welding, tungsten inert gas (TIG) welding, vat photopolymerization.

Further, it is conceivable that the slide coating is produced by means of a thermal spraying method, such as, for example: plasma spraying; flame spraying; wire flame spraying; electric-arc spraying; atmospheric plasma spraying and high velocity oxygen fuel spraying.

Further, it is conceivable that the slide coating is produced by means of any one of the following methods: detonation spraying; laser spraying; galvanic coating; powder coating; electromagnetic pulse welding, electron beam physical vapor deposition.

Possible materials for a slide coating are: bronze alloys; aluminum-tin alloys; white metal; metal-matrix composites with dry lubricants, and also combinations thereof.

BRIEF DESCRIPTION OF THE DRAWINGS

For the purpose of better understanding of the invention, it will be elucidated in more detail by means of the figures below.

These show in a respectively very simplified schematic representation:

FIG. 14 a slide bearing pad of the third exemplary embodiment of the slide bearing arrangement in a first perspective representation;

FIG. 15 the slide bearing pad of the third exemplary embodiment of the slide bearing arrangement in a second perspective representation;

FIG. 16 the slide bearing pad of the third exemplary embodiment of the slide bearing arrangement in a third perspective representation;

FIG. 17 another exemplary embodiment of the slide bearing arrangement with slide bearing pads, which are screwed to a slide bearing pad reception ring, in a first perspective view;

DETAILED DESCRIPTION OF THE PREFERRED EMBODIMENTS

First of all, it is to be noted that, in the different embodiments described, equal parts are provided with equal reference numbers and/or equal component designations, where the disclosures filled into in the entire description may be analogously transferred to equal parts with equal reference numbers and/or equal component designations. Moreover, the specifications of location, such as at the top, at the bottom, at the side, chosen in the description refer to the directly described and depicted figure, and in case of a change of position, these specifications of location are to be analogously transferred to the new position.

Figure 1:
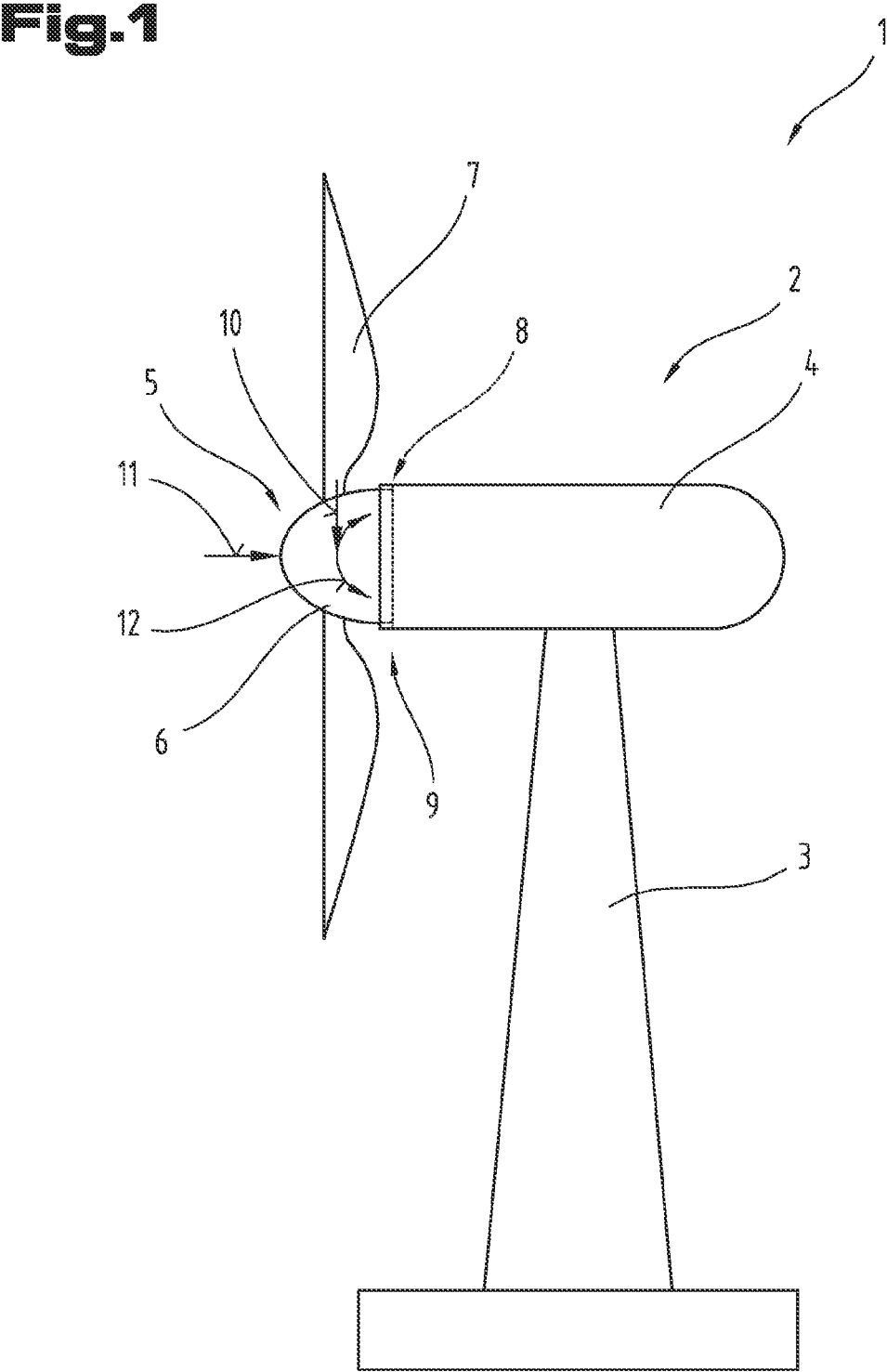
FIG. 1 a schematic representation of a wind turbine.

FIG. 1 shows, in a schematic representation, a first exemplary embodiment of a wind turbine 1 for generating electric energy from wind energy. The wind turbine 1 comprises a nacelle 2, which is received on a tower 3 so as to be rotatable. The nacelle 2 comprises a nacelle housing 4, which forms the main structure of the nacelle 2. Arranged in the nacelle housing 4 of the nacelle 2 are the electrotechnical components such as a generator of the wind turbine 1, for example.

Further, a rotor 5 is configured, which has a rotor hub 6 with rotor blades 7 arranged thereupon. The rotor hub 6 is considered part of the nacelle 2. The rotor hub 6 is received on the nacelle housing 4 by means of a rotor bearing arrangement 8 so as to be rotatably movable. In particular, it is provided that a slide bearing arrangement 9 in accordance with the invention, which slide bearing arrangement 9 will be described in more detail below, is used as rotor bearing arrangement 8. In particular, it can be provided that the rotor hub 6 is arranged on a rotor shaft 16, wherein the rotor shaft 16 is mounted in the rotor bearing arrangement 8.

The rotor bearing arrangement 8, which serves to mount the rotor hub 6 on the nacelle housing 4 of the nacelle 2, is configured for receiving a radial force 10 and an axial force 11. The axial force 11 is a result of the force of the wind. The radial force 10 is a result of the weight of the rotor 5 and acts on the center of gravity of the rotor 5. As the center of gravity of the rotor 5 lies outside of the rotor bearing arrangement 8, a tilting moment 12 is caused in the rotor bearing arrangement 8 by the radial force 10. The tilting moment 12 can equally be caused by an uneven load on the rotor blades 7. This tilting moment 12 can be absorbed by means of a second bearing arrangement, which is arranged at a distance to the rotor bearing arrangement 8. The second bearing arrangement can be configured in the region of the generator, for example.

Figure 2:
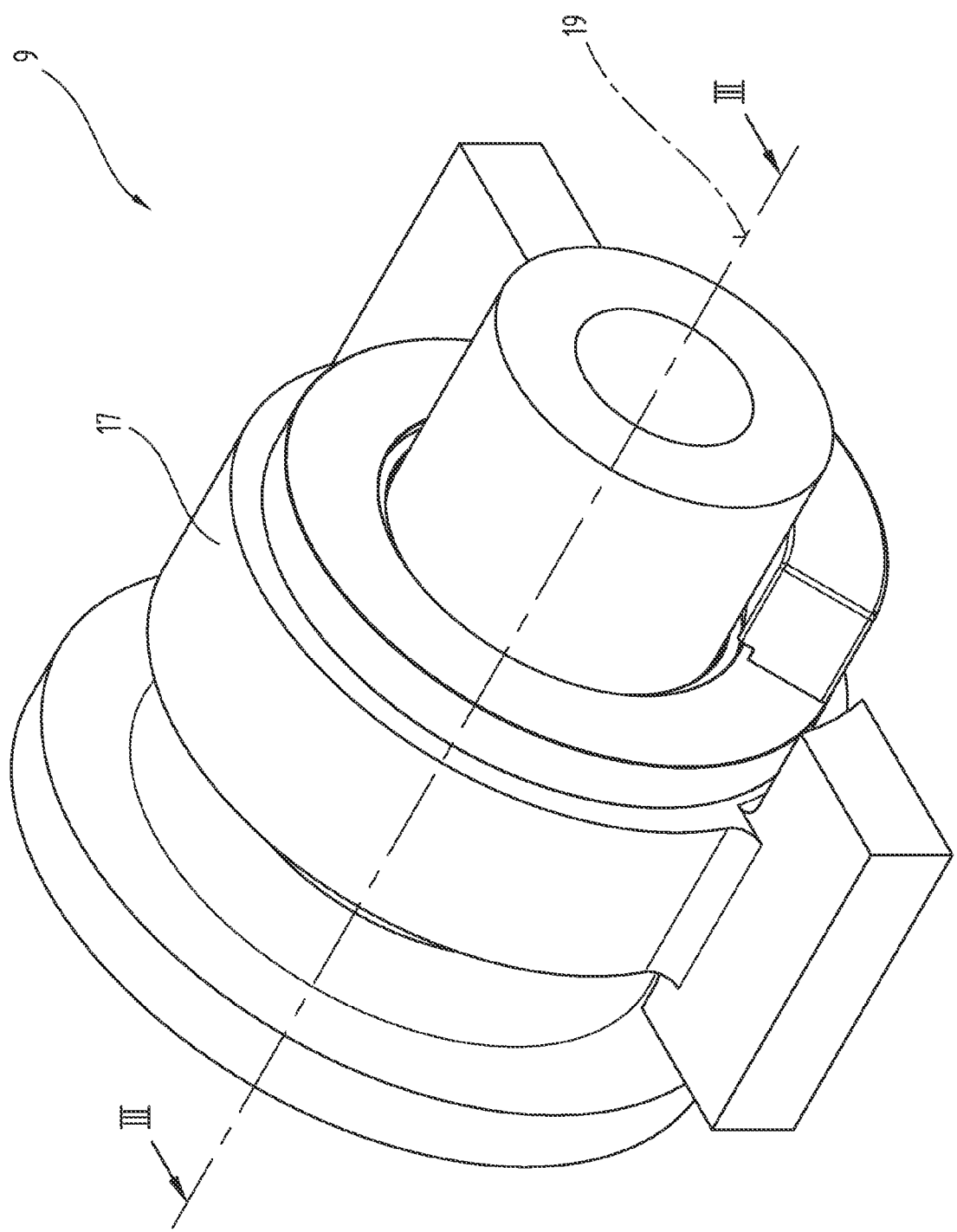
FIG. 2 a perspective representation of a first exemplary embodiment of a slide bearing arrangement.

FIG. 2 shows a first exemplary embodiment of the slide bearing arrangement 9 integrated in the nacelle 2. Of course, the slide bearing arrangement 9 represented in FIG. 2 can also be used in any and all other industrial applications outside of wind turbines. The slide bearing arrangement 9 is represented in FIG. 2 in a perspective view.

Figure 3:
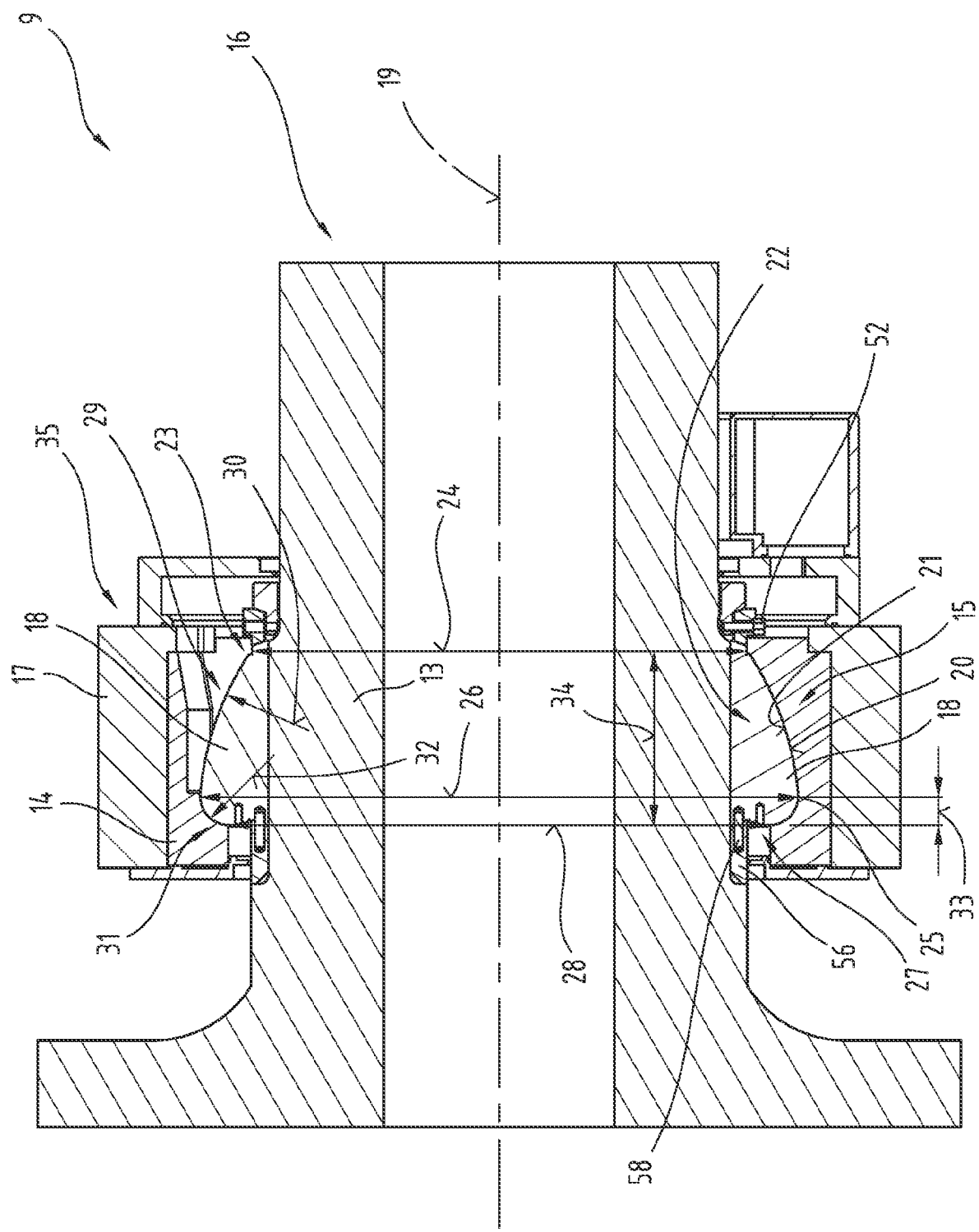
FIG. 3 a longitudinal section of the first exemplary embodiment of the slide bearing arrangement.

FIG. 3 shows the first exemplary embodiment of the slide bearing arrangement 9 in a longitudinal sectional representation.

Subsequently, the slide bearing arrangement 9 is described by means of a combination of FIGS. 2 and 3.

As can be seen from FIGS. 2 and 3, it can be provided that the slide bearing arrangement 9 has an inner ring element 13 and an outer ring element 14. Arranged between the inner ring element 13 and the outer ring element 14 is a slide bearing element 15, which serves to mount the inner ring element 13 relative to the outer ring element 14 in a rotational slide bearing arrangement.

In the exemplary embodiment which is represented in FIGS. 2 and 3, the inner ring element 13 is configured as rotor shaft 16. Of course, the inner ring element 13 can also be any other type of shaft. Further, it is also conceivable that the inner ring element 13 is configured as an independent component, which is received on a shaft, in particular on a rotor shaft 16.

As can be seen particularly readily from FIG. 3, it can be provided that the outer ring element 14 is received in a bearing block 17. In particular, it can be provided that the bearing block 17 is coupled with the nacelle housing 4, or is alternatively also directly shaped in the nacelle housing 4. In this exemplary embodiment, it can therefore be provided that the outer ring element 14 is rigidly coupled with the nacelle housing 4 and the inner ring element 13 is rotatable, by means of the slide bearing element 15, relative to the outer ring element 14 with respect to an axis of rotation 19.

Further, it can be provided that the bearing block 17 serves directly as outer ring element 14.

Therefore, the rotor shaft 16 is received in the nacelle housing 4, by means of the slide bearing arrangement 9, so as to be rotatable.

As can further be seen from FIGS. 2 and 3, it can be provided that the slide bearing element 15 comprises multiple individual slide bearing pads 18, which are arranged across the circumference so as to be distributed between the inner ring element 13 and the outer ring element 14.

Due to the structure shown in FIG. 3, the individual slide bearing pads 18 are firmly coupled with the inner ring element 13 in the operating mode of the slide bearing arrangement 9 and therefore rotate with same relative to the outer ring element 14. To enable the rotational movement between the inner ring element 13 and the outer ring element 14, a bearing surface 20 is configured on each of the individual slide bearing pads 18, which rests against a mating surface 21 of the outer ring element 14 in the ready mode of the slide bearing arrangement 9. The mating surface 21 is arranged on an inner face 22 of the outer ring element 14.

The bearing surface 20 of the slide bearing pad 18 and the mating surface 21 of the outer ring element 14 are configured as sliding surfaces, which slide against each other during operation of the slide bearing arrangement 9. In particular, it can be provided that the mating surface 21 of the outer ring element 14 is configured as a hard, wear-resistant surface, which can be formed by a hardened steel, for example. The bearing surface 20 of the slide bearing pad 18 can be formed from a slide bearing raw material that is soft in comparison to the mating surface 21. Of course, it is also conceivable that the bearing surface 20 has a slide coating.

As can be seen particularly readily from FIG. 3, it can be provided that the individual slide bearing pads 18 each have a bearing surface 20 that is cambered, viewed in an axial direction.

As can further be seen from FIG. 3, it can be provided that the bearing surface 20 has a first diameter 24 in the region of a first axial end 23 of the slide bearing pad 18. Starting from this first axial end 23, the bearing surface 20 can have a diameter increase towards an apex 25. The bearing surface 20 can have a diameter 26 at the apex 25.

Starting from the apex 25, the bearing surface 20 can have a diameter decrease towards a second axial end 27 of the slide bearing pad 18. In the region of the second axial end 27, the bearing surface 20 can have a second diameter 28.

In particular, it can be provided that a spherical cap section 29 is configured between the first axial end 23 and the apex 25. The spherical cap section 29 can have the basic form of a spherical cap with a spherical cap radius 30.

Between the second axial end 27 and the apex 25, a transition section 31 can be configured. The transition section 31 can have a transition radius 32. In particular, it can be provided that the transition radius 32 is smaller than the spherical cap radius 30.

It can further be provided that the apex 25 is arranged at a distance 33 from a second axial end 27 of the slide bearing pad 18. The slide bearing pad 18 can have an axial extension 34.

Figure 4:
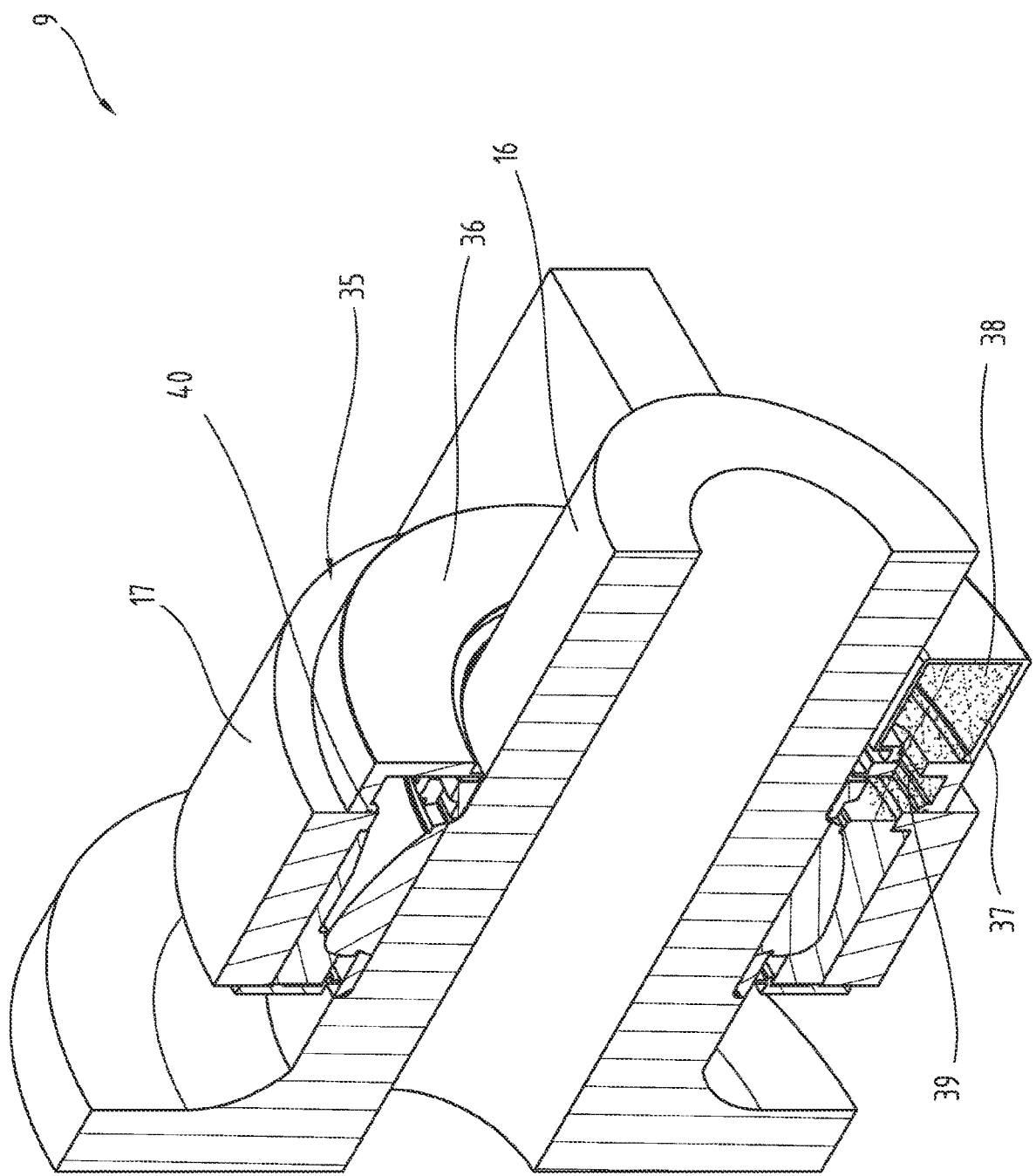
FIG. 4 a perspective view of the longitudinal section of the first exemplary embodiment of the slide bearing arrangement.

FIG. 4 shows the first exemplary embodiment of the slide bearing arrangement 9 in a perspective sectional representation, wherein the same reference numbers and/or the same component designations as in the preceding FIGS. 1 to 3 are used again. To avoid unnecessary repetitions, the detailed description in the preceding FIGS. 1 to 3 should be noted and/or is referred to.

As can further be seen from FIG. 4, it can be provided that a cover 36 is arranged on an axial end 35 of the bearing block 17. The cover 36 serves to close up the interior of the bearing block 17.

As can further be seen from FIG. 4, it can be provided that a lubricating oil reservoir 37 is adjoined to the cover 36, which lubricating oil reservoir 37 serves to receive lubricating oil 38. In particular, it can be provided here that a pass-through opening 39 is configured in the cover 36, through which the lubricating oil 38 from the lubricating oil reservoir 37 can flow into the interior of the bearing block 17.

As can further be seen from FIG. 4, it can be provided that a seal 40 is received in the cover 36, which seal 40 serves to seal the cover 36 against the bearing block 17. It can further be provided that another seal is configured, which serves to form a seal between the cover 36 and the rotor shaft 16. In particular, it can be provided that the other seal directly interacts with the rotor shaft 16, as can be seen from FIG. 4. The other seal can be a shaft sealing ring, for example.

Figure 5:
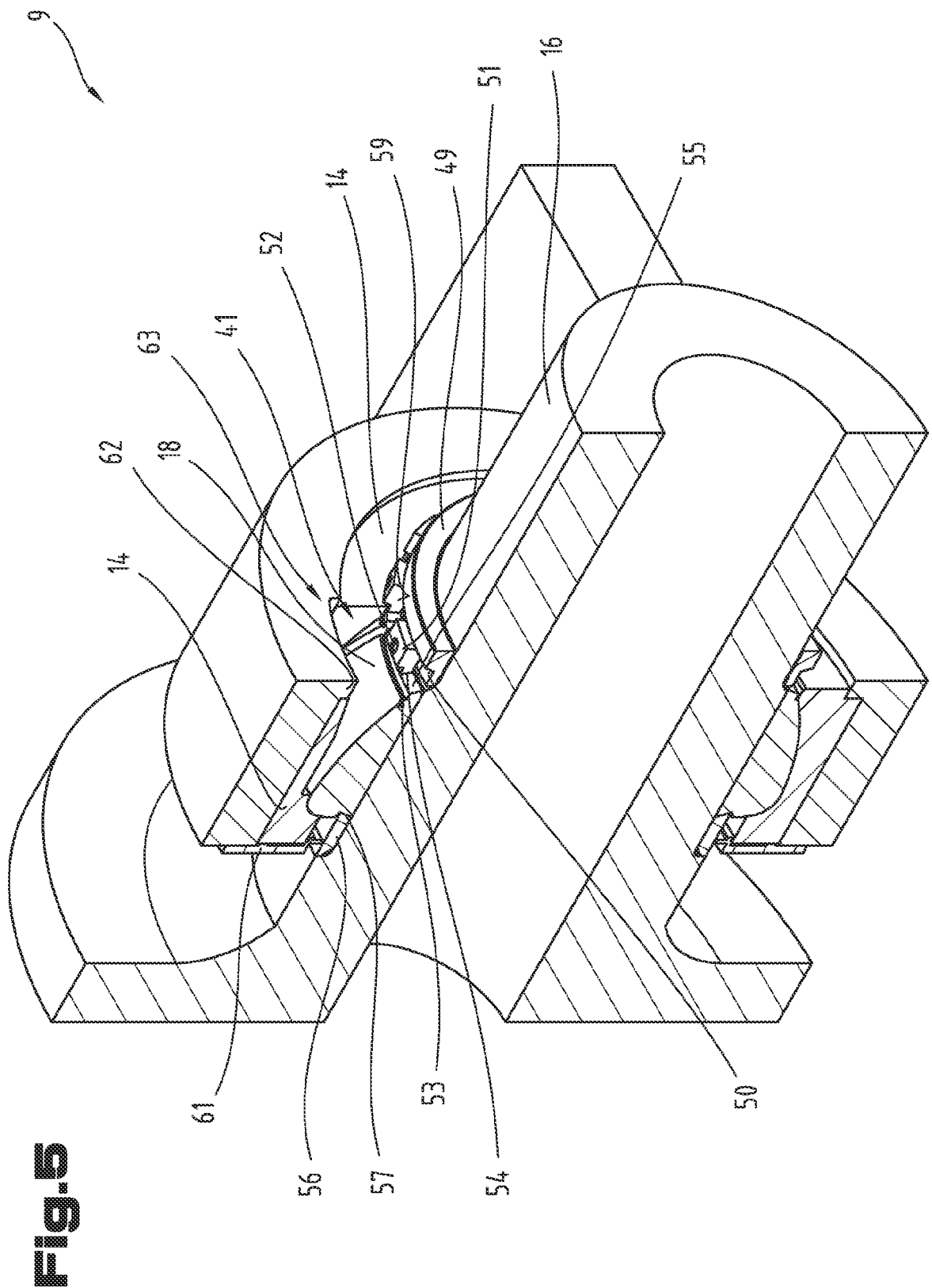
FIG. 5 a perspective view of the longitudinal section of the first exemplary embodiment of the slide bearing arrangement, wherein a cover is blanked out.

FIG. 5 shows a perspective sectional representation of the slide bearing arrangement 9, wherein the same reference numbers and/or the same component designations as in the preceding FIGS. 1 to 4 are used again. To avoid unnecessary repetitions, the detailed description in the preceding FIGS. 1 to 4 should be noted and/or is referred to.

In FIG. 5, the cover 36 and the lubricating oil reservoir 37 are blanked out for better clarity. Therefore, the interior components of the slide bearing 9 are visible.

As can be seen from FIG. 5, it can be provided that a removal opening 41 is configured in the outer ring element 14, which removal opening 41 serves to axially remove individual of the slide bearing pads 18.

Figure 6:
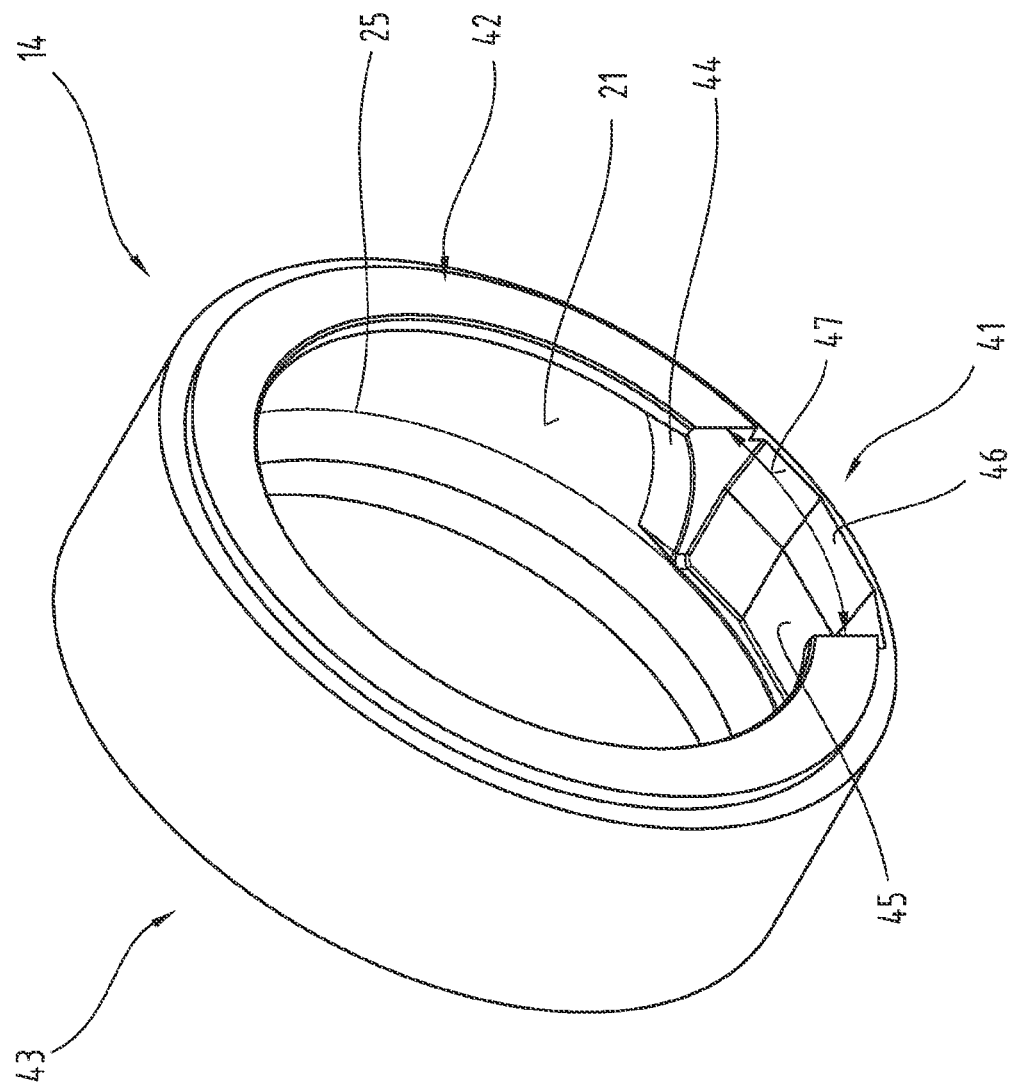
FIG. 6 a perspective view of the first exemplary embodiment of an outer ring element.

FIG. 6 shows a perspective view of the outer ring element 14, wherein the same reference numbers and/or the same component designations as in the preceding FIGS. 1 to 5 are used again. To avoid unnecessary repetitions, the detailed description in the preceding FIGS. 1 to 5 should be noted and/or is referred to.

In FIG. 6, the removal opening 41 is visible particularly clearly.

As can be seen from FIGS. 5 and 6, it can be provided that the removal opening 41 interrupts, at least in sections, the mating surface 21 configured in the outer ring element 14. In particular, it can be provided that the removal opening 41 extends starting from a first axial end 42 of the outer ring element 14. In particular, it can be provided that the removal opening 41 does not extend up to a second axial end 43 of the outer ring element 14. Rather, the removal opening 41 may extend only up to the apex 25.

As can further be seen from FIG. 6, it can be provided that an oil feed 44 adjoining the removal opening 41 is configured in the outer ring element 14 in a circumferential direction, which oil feed 44 forms the transition between the removal opening 41 and the mating surface 21. In particular, it can be provided that the oil feed 44 is configured cone-shaped, for example.

As can be seen particularly readily from a combination of FIGS. 3 and 6, it can be provided that the removal opening 41 is configured so as to widen radially towards the first axial end 42. In particular, it can be provided here that a first removal opening region 45 and a second removal opening region 46 are configured, each of which have a different radial widening. It can further be provided that the second removal opening region 46, which is arranged closer to the first axial end 42 of the outer ring element 14, has a larger radial widening than the first removal opening region 45.

In another exemplary embodiment, which is not represented, it can also be provided, of course, that the removal opening 41 completely penetrates the outer ring element 14 radially.

Figure 7:
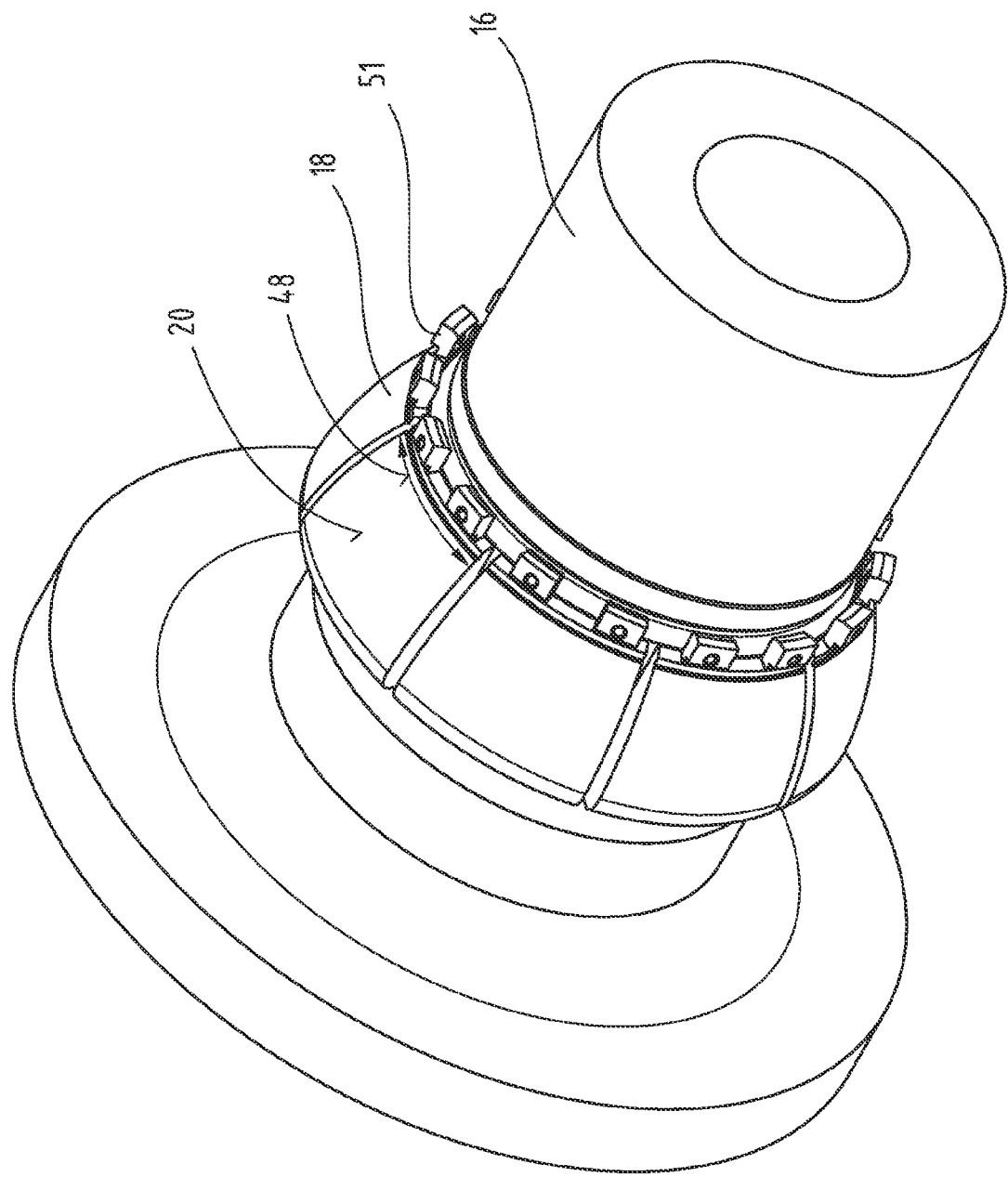
FIG. 7 a perspective view of the first exemplary embodiment of a rotor shaft with slide bearing pads arranged thereupon.

FIG. 7 shows the rotor shaft 16 with the slide bearing pads 18 arranged thereupon in a perspective view, wherein the same reference numbers and/or the same component designations as in the preceding FIGS. 1 to 6 are used again. To avoid unnecessary repetitions, the detailed description in the preceding FIGS. 1 to 6 should be noted and/or is referred to.

As can be seen from a combination of FIGS. 6 and 7, it can be provided that the removal opening 41 has a circumferential extension 47. The individual slide bearing pads 18 can have a circumferential extension 48.

As can be seen particularly readily from FIG. 5, it can be provided that a shaft nut 49 is configured, which can be screwed onto the rotor shaft 16. On the shaft nut 49, an axial securing element reception 50 can be configured, which serves to receive individual axial securing elements 51. In particular, it can be provided that the axial securing element reception 50 comprises a tapped hole, wherein the individual axial securing elements 51 can be screwed into the tapped hole in a radial direction by means of a fastening screw 52.

It can further be provided that the axial securing elements 51 have a wedge surface 54 on an axial end 23. On the first axial end 23 of the slide bearing pad 18, a first mating wedge surface 55 can be configured. In particular, it can be provided that the wedge surface 54 interacts with and/or rests against the first mating wedge surface 55.

As can further be seen from FIG. 5, it can be provided that an axial stop ring 56 is configured, which, together with the axial securing element 51, serves to clamp the slide bearing pad 18.

In particular, the individual slide bearing pads 18 can be clamped between the axial stop ring 56 and the axial securing element 51 and/or between multiple axial securing elements 51.

As can be seen from FIG. 5, it can be provided that the axial stop ring 56 has a wedge surface 57, which is configured such that an interlocking bond between the slide bearing pad 18 and the axial stop ring 56 can be achieved.

As can be seen from FIG. 3, it can be provided that an antitwist protection element 58 is configured, which acts between the axial stop ring 56 and the slide bearing pad 18. In particular, it can be provided that the antitwist protection element 58 is configured in the form of a cylindrical pin, which is received in a bore in the axial stop ring 56 and/or in a bore in the slide bearing pad 18.

As can be seen from FIG. 5, it can be provided that a rotation surface 59 for a seal arranged in the cover 36 is configured on the shaft nut 49. Analogously, a rotation surface 60 can be configured in the axial stop ring 56. The rotation surface 60 can interact with a seal arranged in a second cover 61.

As can further be seen from FIG. 5, it can be provided that the bearing block 17 has an axial stop 62 for the outer ring element 14. It can further be provided that a recess 63 is configured in the axial stop 62, which recess 63 corresponds with the removal opening 41.

In the assembled state of the slide bearing arrangement 9, the outer ring element 14 is received in the bearing block 17. Here, it can be provided that the outer ring element 14 is clamped axially between the second cover 61 and the axial stop 62 in the bearing block 17. Here, it can be provided that the second cover 61 is screwed axially against the bearing block by means of fastening means.

The axial stop ring 56 can be affixed to the rotor shaft 16. Further, the shaft nut 49 can be screwed onto the rotor shaft 16. As can be seen from FIG. 5, individual slide bearing pads 18 can be clamped between the axial stop ring 56 and at least one axial securing element 51 each. Due to the shape of the axial stop ring 56 and/or of the axial securing element 51, the slide bearing pads 18 can be coupled with the rotor shaft 16 so as to be clamped in an interlocking manner both in an axial direction and in a radial direction.

To change the individual slide bearing pads 18, the cover 36 can be removed from the bearing block 17. Alternatively, it is also conceivable that a maintenance opening is configured in the cover 36, which maintenance opening can be uncoupled from the cover 36, whereby the interior of the bearing block 17 is accessible.

In another alternative, it is also conceivable that the cover 36 is configured so as to be divided, so that it can be removed radially from the rotor shaft 16 and need not be displaced along the rotor shaft 16 in an axial direction. Here, the cover 36 can be configured so as to be divided in a center plane, for example.

When the interior components of the bearing block 17 are accessible in accordance with the representation according to FIG. 5, in order to change the individual slide bearing pads 18, respectively one slide bearing pad 18 to be changed can be twisted into the region of the removal opening 41. Subsequently, the axial securing element 51 of the slide bearing pad 18 to be changed can be released and removed. This ensures that the slide bearing pad 18 to be changed is no longer clamped on the rotor shaft 16. In another method step, the slide bearing pad 18 to be changed can be displaced axially and/or optionally simultaneously also radially outward through the removal opening 41 in order to remove the slide bearing pad 18 from the inside of the bearing block 17. In another method step, a new slide bearing pad 18 can be inserted again into the inside of the bearing block 17 and/or be clamped with the axial securing element 51 in reverse sequence. This operation can be repeated for all slide bearing pads 18 to be changed.

Subsequently, the inside of the bearing block 17 can be closed up again by means of the cover 36 and thus the slide bearing arrangement 9 can be made operational again.

Figure 8:
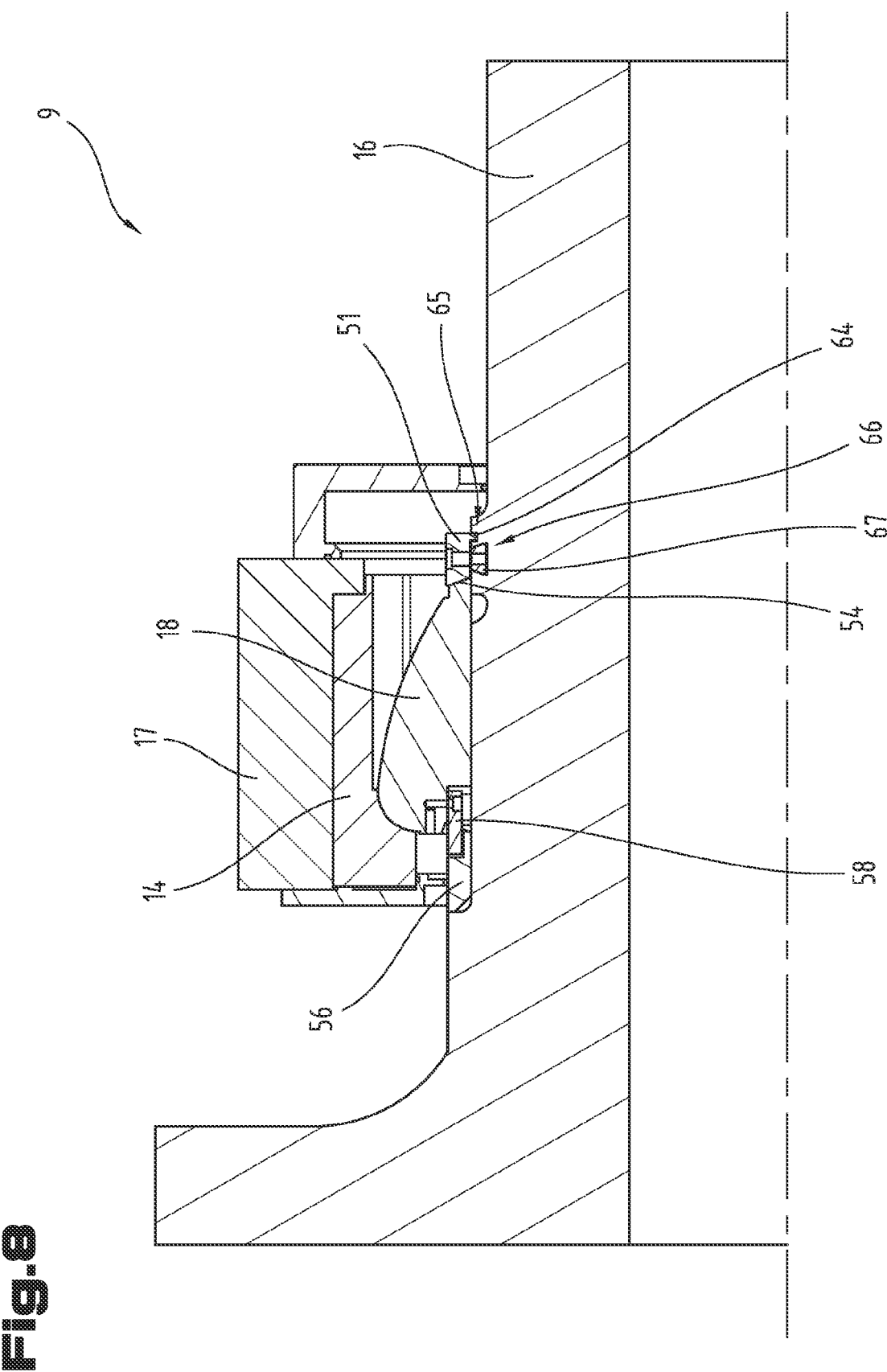
FIG. 8 a longitudinal section of a second exemplary embodiment of the slide bearing arrangement.

FIG. 8 shows another embodiment of the slide bearing arrangement 9 that is optionally independent in itself, wherein the same reference numbers and/or the same component designations as in the preceding FIGS. 1 to 7 are used again. To avoid unnecessary repetitions, the detailed description in the preceding FIGS. 1 to 7 should be noted and/or is referred to.

As can be seen from FIG. 8, it can be provided that the antitwist protection elements 58 can be configured in the form of feather keys, for example, which can be screwed to the slide bearing pad 18. Further, a recess for receiving the antitwist protection element 58 can be configured in the axial stop ring 56.

Independent of the other features and as can further be seen from FIG. 8, it can be provided that the axial securing element 51 has a stop dog 64, which can be received in a groove 65 that is inserted in the rotor shaft 16. Here, the axial securing element 51 can equally have a wedge surface 54, which serves to clamp the slide bearing pad 18. Further, a trapezoid groove 66 can be configured in the rotor shaft 16, in which trapezoid groove 66 a T-nut 67 can be received. In particular, the T-nut 67 can be displaceable relative to the rotor shaft 16 in a circumferential direction. The T-nut 67 can have an internal thread, which serves to screw in the fastening screw 52 for clamping the axial securing element 51.

Figure 9:
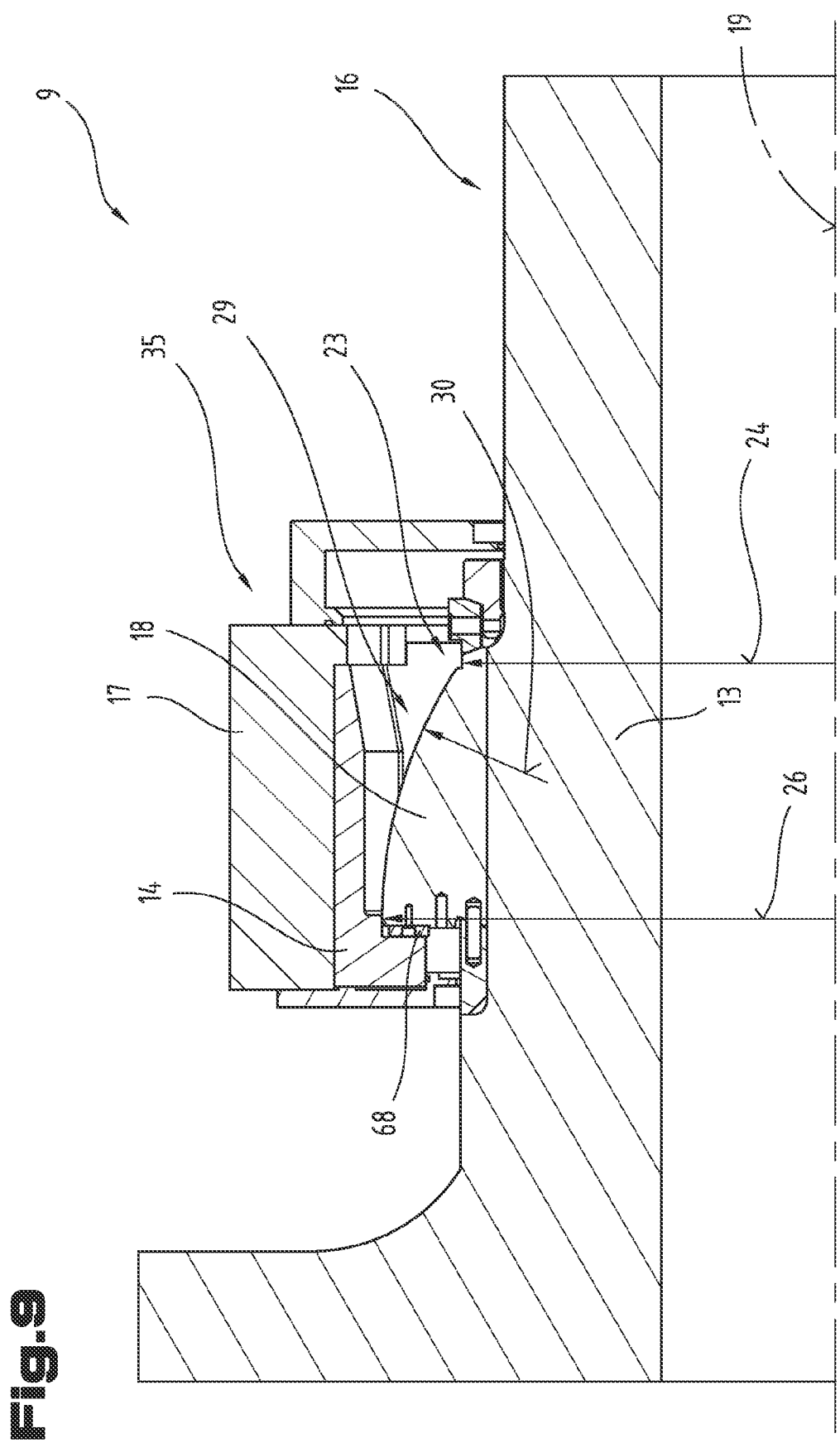
FIG. 9 a longitudinal section of a third exemplary embodiment of the slide bearing arrangement.

FIG. 9 shows another embodiment of the slide bearing arrangement 9 that is optionally independent in itself, wherein the same reference numbers and/or the same component designations as in the preceding FIGS. 1 to 8 are used again. To avoid unnecessary repetitions, the detailed description in the preceding FIGS. 1 to 8 should be noted and/or is referred to.

As can be seen from FIG. 9, it can be provided that a thrust ring segment 68 is arranged on the slide bearing pad 18. The thrust ring segment 68 can serve to receive axial forces between the slide bearing pad 18 and the outer ring element 14. In particular, it can be provided that the thrust ring segment 68 has a sliding surface and that the outer ring element 14 has a mating sliding surface, wherein the sliding surface and the mating sliding surface rest against each other and slide against each other during operation.

FIGS. 10 to 13 show another, third embodiment of the slide bearing arrangement 9 that is optionally independent in itself, wherein the same reference numbers and/or the same component designations as in the preceding FIGS. 1 to 9 are used again. To avoid unnecessary repetitions, the detailed description in the preceding FIGS. 1 to 9 should be noted and/or is referred to.

Figure 10:
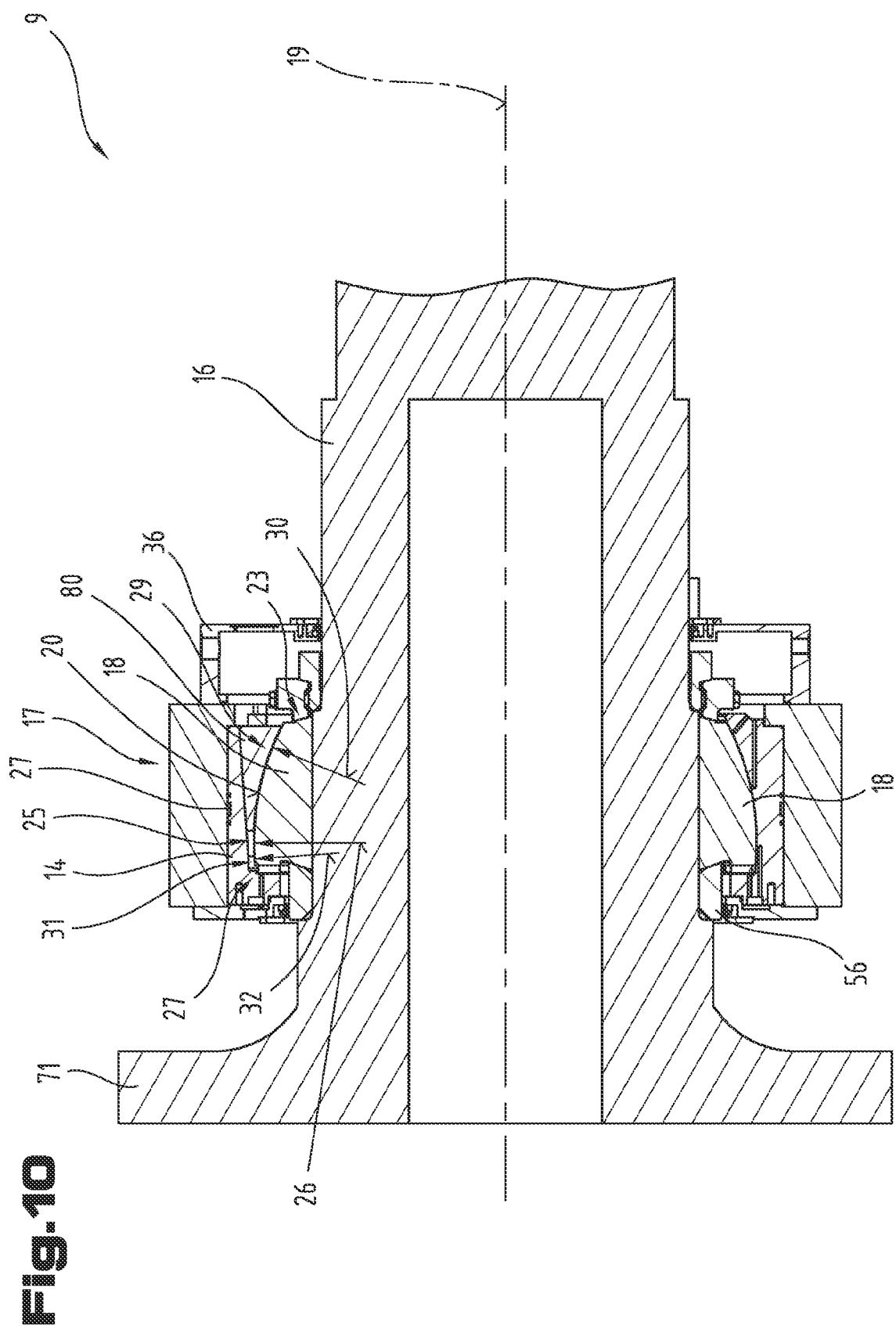
FIG. 10 a longitudinal section of a fourth exemplary embodiment of the slide bearing arrangement.

As can be seen from FIG. 10, it can be provided that the bearing surface 20 has a diameter increase towards the apex 25 in the region of the first axial end 23 of the slide bearing pad 18, starting from the first axial end 23. The bearing surface 20 can have a diameter 26 at the apex 25.

As can further be seen from FIG. 10, the bearing surface 20 can have a diameter decrease towards the second axial end 27, starting from the apex 25.

In the exemplary embodiment according to FIG. 10, it can be provided that a spherical cap section 29 is configured between the first axial end 23 and the apex 25. The spherical cap section 29 can have the basic form of a spherical cap with a spherical cap radius 30.

Between the second axial end 27 and the apex 25, a transition section 31 can be configured. The transition section 31 can have a transition radius 32. In the exemplary embodiment according to FIG. 10, it can be provided that the transition radius 32 and the spherical cap radius 30 have the same size. The transition radius 32 and the spherical cap radius 30 can therefore transition to each other at the apex 25 without a kink.

In addition to the transition section 31, a thrust ring segment 68 can be arranged on the second axial end 27 of the slide bearing pad 18, which thrust ring segment 68 can serve to receive axial forces.

Figure 11:
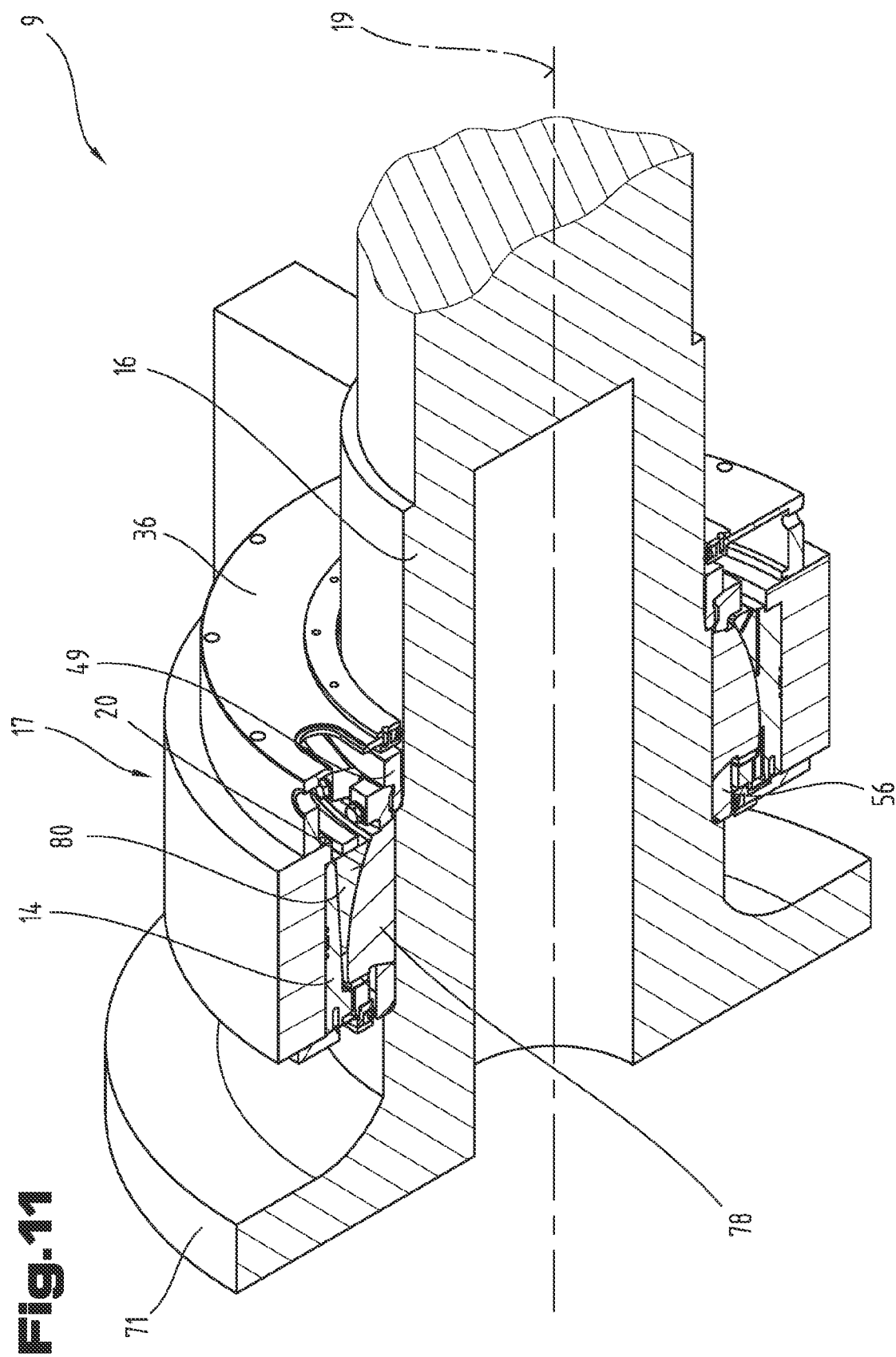
FIG. 11 a perspective view of the longitudinal section of the third exemplary embodiment of the slide bearing arrangement.

As can be seen from FIG. 11, it can be provided that the rotor shaft 16 has a rotor shaft flange 71, which can serve to flange the rotor hub 6.

Figure 12:
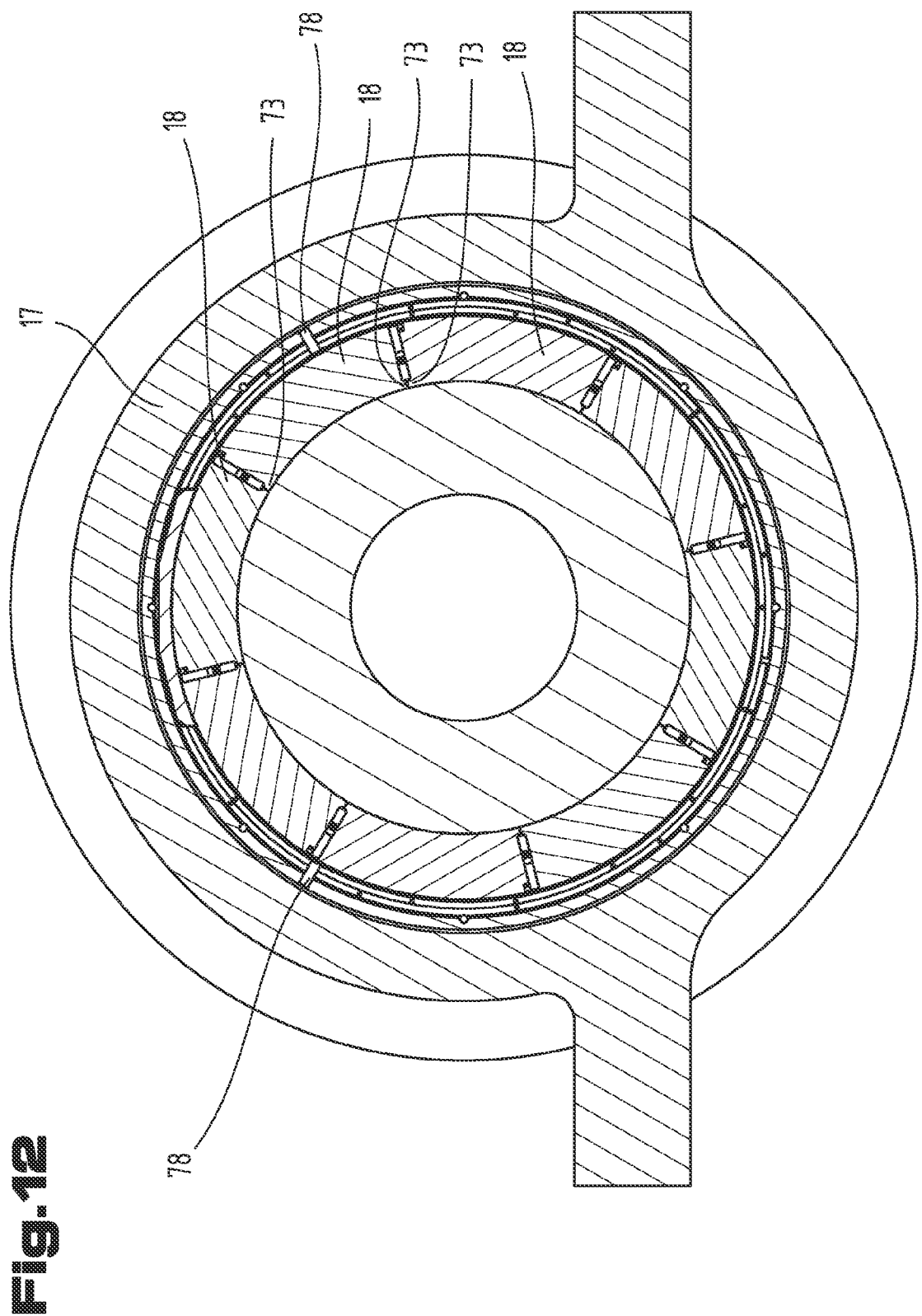
FIG. 12 a cross section of the third exemplary embodiment of the slide bearing arrangement.

As can be seen from FIG. 12, it can be provided that spacers 73 are configured on the individual slide bearing pads 18. The spacers 73 serve to correctly space the individual slide bearing pads 18 in relation to one another in a circumferential direction. In particular, it can be provided that, on at least one of the circumferential faces 74 of the slide bearing pad 18, the spacers 73 are configured exclusively in the region of the inner face 72 and do not extend across the complete height of the slide bearing pads 18. It can further be provided that the spacers 73 are configured on both circumferential faces 74 of the slide bearing pad 18.

Figure 13:
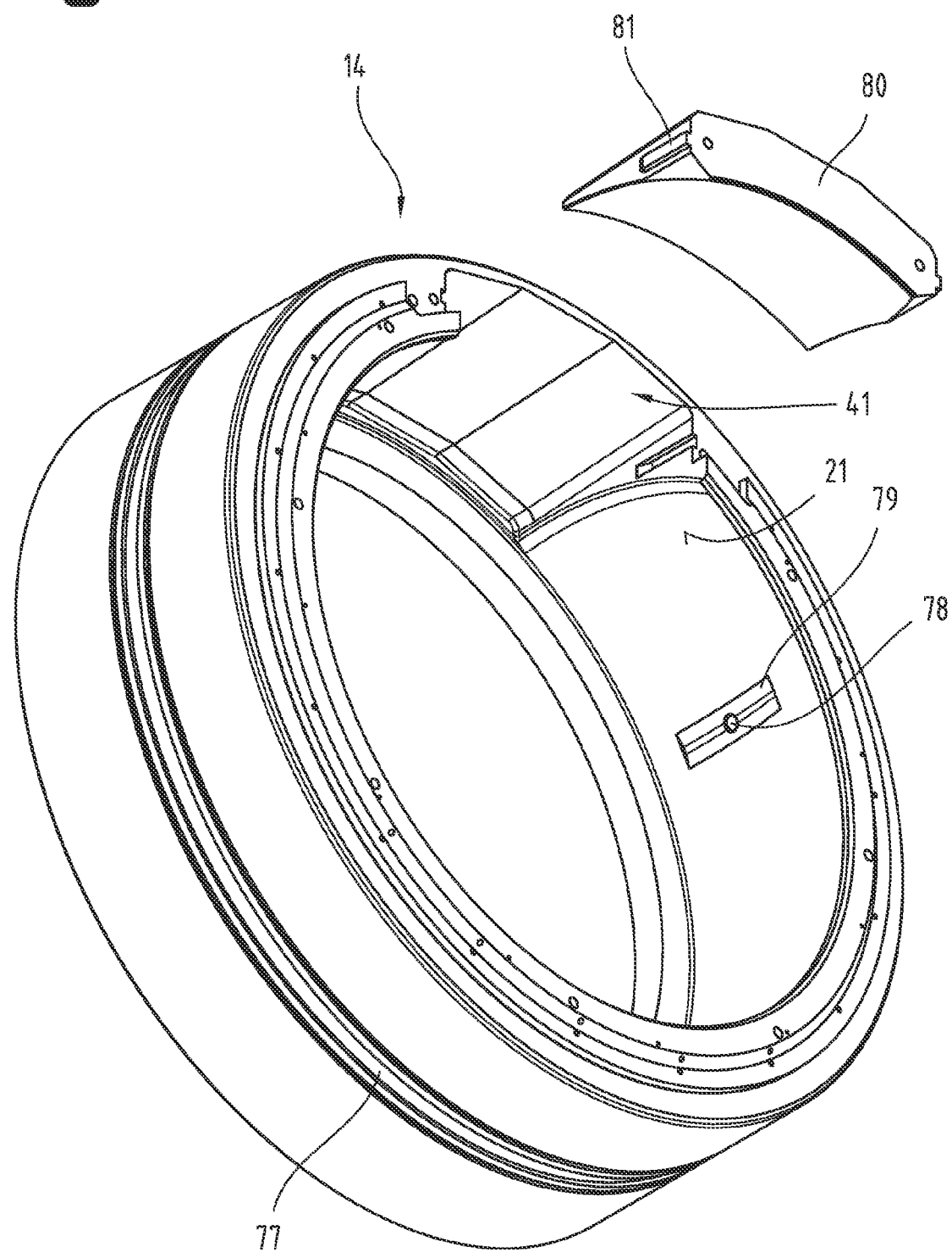
FIG. 13 a perspective representation of an outer ring element of the third exemplary embodiment of the slide bearing arrangement.

As can be seen from a combination of the FIGS. 11, 12 and 13, it can be provided that a circumferential lubricating oil distribution groove 77 is configured on a circumference of the outer ring element 14. The lubricating oil distribution groove 77 can be configured on the surface on which the outer ring element 14 rests against the bearing block 17. The lubricating oil distribution groove 77 can therefore be bounded by the outer ring element 14 and the bearing block 17 and therefore form a fluid canal for transporting a lubricating oil. Further, it can be provided that a lubricating oil bore 78 is configured, which flow-connects the lubricating oil distribution groove 77 with the mating surface 21. In the region of the mating surface 21, the lubricating oil bore 78 can open into an oil pocket 79. The oil pocket 79 can extend across a large portion of the width of the mating surface 21. This has the advantage that the slide bearing pads 18 can be supplied with lubricating oil via the lubricating oil distribution groove 77 by means of an oil pump.

Further, it can be provided that a seal is arranged on both sides of the lubricating oil distribution groove 77, which seal serves to seal the lubricating oil distribution groove 77 between the outer ring element 14 and the bearing block 17.

As can be seen particularly readily from FIG. 13, it can be provided that a filler element 80 is configured, which serves to be inserted in the removal opening 41 of the outer ring element 14. In the inserted state, the filler element 80 can complete, or at least partially complete, the mating surface 21. This results in improved sliding properties.

It can further be provided that the filler element 80 can be coupled with the outer ring element 14 by means of an interlocking bond 81, in particular by means of a connecting groove. It can further be provided that the filler element 80 is secured in its position by means of a securing element, which is not represented.

FIGS. 14 to 16 show a detailed view of the slide bearing pad 18 from the third exemplary embodiment of the slide bearing arrangement 9 in different perspective representations, wherein the same reference numbers and/or the same component designations as in the preceding FIGS. 1 to 13 are used again. To avoid unnecessary repetitions, the detailed description in the preceding FIGS. 1 to 13 should be noted and/or is referred to.

As can be seen from FIGS. 14 to 16, it can be provided that the thrust ring segment 68 is coupled with the second axial end 27 of the slide bearing pad 18 by means of three fastening means.

Also the spacers 73 can readily be seen in FIGS. 14 to 16.

As can be seen particularly readily from FIG. 14, it can be provided that a reception 70 for producing an interlocking bond with a lifting device is configured on the inner face 72 of the slide bearing pad 18.

As can be seen from FIG. 16, it can be provided that a form element 69, in particular a tapped hole, is configured on the first axial end 23 of the slide bearing pad 18, which form element 69 serves to receive a connection element. By means of the form element 69, the slide bearing pad 18 can be coupled with a slide bearing pad changing device.

Further, it can be provided that a recess 82 is configured in the region of the form element 69, which recess 82, in interaction with the form element 69, serves to couple the slide bearing pad 18 with the slide bearing pad changing device.

Figure 18:
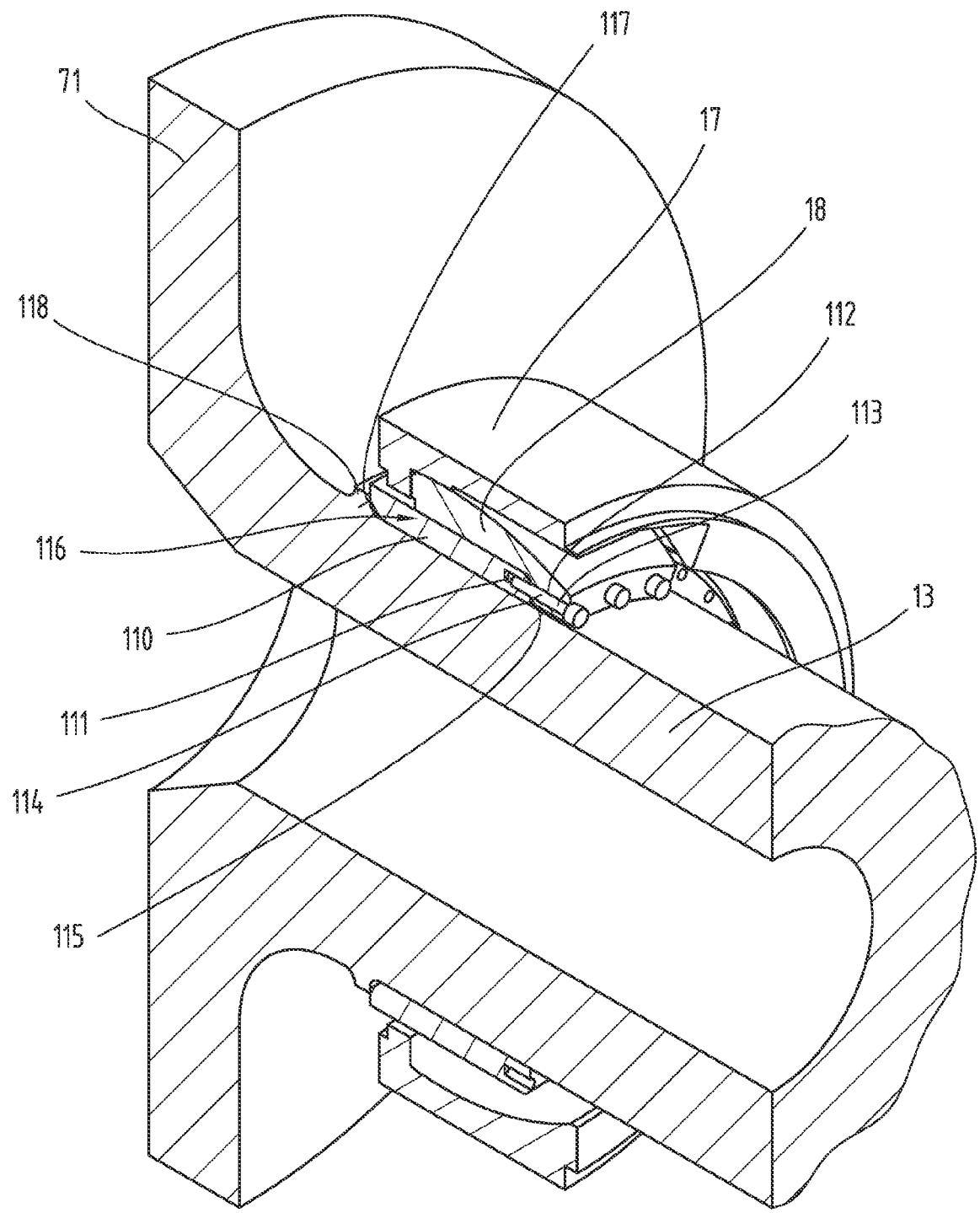
FIG. 18 the other exemplary embodiment of the slide bearing arrangement with slide bearing pads, which are screwed to a slide bearing pad reception ring, in a sectional view.

FIGS. 17 and 18 show another, fourth embodiment of the slide bearing arrangement 9 that is optionally independent in itself, wherein the same reference numbers and/or the same component designations as in the preceding FIGS. 1 to 16 are used again. To avoid unnecessary repetitions, the detailed description in the preceding FIGS. 1 to 16 should be noted and/or is referred to.

For the sake of simplicity, only a single slide bearing pad 18 is represented in FIGS. 17 and 18, wherein, however, also multiple of the slide bearing pads 18 can be arranged so as to be distributed evenly across the circumference, just like in the preceding exemplary embodiments.

As can be seen from FIG. 18, it can be provided that a slide bearing pad reception ring 110 is arranged on the inner ring element 13, which slide bearing pad reception ring 110 serves to receive the individual slide bearing pads 18.

In particular, it can be provided that the individual slide bearing pads 18 have a shoulder 114 on their inner face 72. The shoulder 114 can form a contact surface, so that the slide bearing pad 18 can rest against a first axial end 115 of the slide bearing pad reception ring 110 in the region of the shoulder 114. This ensures that the slide bearing pad 18 can be positioned relative to the slide bearing pad reception ring 110 in an axial direction.

It can further be provided that the shoulder 114 bounds a recess 116, which is configured on the inner face 72 of the slide bearing pad 18. The recess 116 can extend up to the shoulder 114 starting from the second axial end 27 of the slide bearing pad 18. The recess 116 and/or the shoulder 114 can be configured so as to be rotationally symmetric.

In particular, it can be provided that, in the integrated state of the slide bearing pad 18, the slide bearing pad reception ring 110 is at least partially received in the recess 116 of the slide bearing pad 18.

It can further be provided that multiple tapped holes 111 are configured on the first axial end 115 of the slide bearing pad reception ring 110. Corresponding with the tapped holes 111, one, in particular multiple, pass-through holes 112 can be configured in each of the slide bearing pads 18.

Further, fastening screws 113 can be guided through the pass-through holes 112, which fastening screws 113 can be screwed into the tapped holes 111 and can therefore serve to affix the slide bearing pads 18 to the slide bearing pad reception ring 110.

As can further be seen from FIG. 18, it can be provided that a second axial end 117 of the slide bearing pad reception ring 110 rests against a shaft bead 118. This enables the slide bearing pad reception ring 110 to be positioned axially on the inner ring element 13.

The exemplary embodiments show possible embodiment variants, wherein it should be noted in this respect that the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

Any and all specifications of value ranges in the description at issue are to be understood to comprise any and all sub-ranges of same, for example the specification 1 to 10 is to be understood to mean that any and all sub-ranges starting from the lower limit 1 and from the upper limit 10 are comprised therein, i.e. any and all sub-ranges start at a lower limit of 1 or larger and end at on upper limit of 10 or less, e.g. 1 to 1.7, or 3.2 to 8.1, or 5.5 to 10.

Finally, as a matter of form, it should be noted that for ease of understanding of the structure, elements are partially not depicted to scale and/or are enlarged and/or are reduced in size.

LIST OF REFERENCE NUMBERS 1 wind turbine
2 nacelle
3 tower
4 nacelle housing
5 rotor
6 rotor hub
7 rotor blade
8 rotor bearing arrangement
9 slide bearing arrangement
10 radial force
11 axial force
12 tilting moment
13 inner ring element
14 outer ring element
15 slide bearing element
16 rotor shaft
17 bearing block
18 slide bearing pad
19 axis of rotation
20 bearing surface
21 mating surface
22 inner face
23 first axial end
24 first diameter
25 apex
26 diameter at apex
27 second axial end
28 second diameter
29 spherical cap section
30 spherical cap radius
31 transition section
32 transition radius
33 distance
34 axial extension of slide bearing pad
35 axial front end of bearing block
36 cover
37 lubricating oil reservoir
38 lubricating oil
39 pass-through opening
40 seal
41 removal opening
42 first axial end of outer ring element
43 second axial end of outer ring element
44 oil feed
45 first removal opening region
46 second removal opening region
47 circumferential extension of removal opening
48 circumferential extension of slide bearing pad
49 shaft nut
50 axial securing element reception
51 axial securing element
52 fastening screw
53 axial end of axial securing element
54 wedge surface of axial securing element
55 first mating wedge surface
56 axial stop ring
57 wedge surface of axial stop ring
58 antitwist protection element
59 rotation surface of shaft nut
60 rotation surface of axial stop ring
61 second cover
62 axial stop
63 recess
64 stop dog
65 groove
66 trapezoid groove
67 T-nut
68 thrust ring segment
69 form element of slide bearing pad
70 reception for lifting device 71 rotor shaft flange
72 inner face
73 spacer
74 circumferential face
75 lubricating oil transport groove
76 second mating wedge surface
77 lubricating oil distribution groove
78 lubricating oil bore
79 oil pocket
80 filler element
81 interlocking bond
82 recess
110 slide bearing pad reception ring
111 tapped hole
112 pass-through hole
113 fastening screw
114 shoulder
115 first axial end of slide bearing pad reception ring
116 recess
117 second axial end of slide bearing pad reception ring
118 shaft bead

The invention claimed is:

1. A slide bearing arrangement, comprising:
an inner ring element;
an outer ring element; and
at least one slide bearing element, which is arranged between the inner ring element and the outer ring element,
wherein a bearing surface of the slide bearing element and a mating surface of the outer ring element rest against each other,
wherein the slide bearing element comprises at least two slide bearing pads, and
wherein the individual slide bearing pads each have a bearing surface that is cambered, viewed in an axial direction, in at least one sub-region,
wherein a removal opening is configured in the outer ring element, wherein the removal opening interrupts the mating surface of the outer ring element.

2. The slide bearing arrangement according to claim 1, wherein the individual slide bearing pads have the basic form of a spherical cap with a spherical cap radius in a spherical cap section and have a transition radius in a transition section.

3. The slide bearing arrangement according to claim 2, wherein the spherical cap section extends up to an apex and the transition section adjoins the spherical cap section at the apex.

4. The slide bearing arrangement according to claim 2, wherein each of the at least two slide bearing pads has a first axial end and a second axial end and the apex is arranged at a distance from the second axial end, wherein the distance is between 1% and 49% of an axial extension of the slide bearing pad.

5. The slide bearing arrangement according to claim 1, wherein the removal opening extends from a first axial end of the outer ring element.

6. The slide bearing arrangement according to claim 5, wherein the removal opening has a circumferential extension and wherein the slide bearing pads each have a circumferential extension, wherein the circumferential extension of the slide bearing pads is between 60% and 99.9% of the circumferential extension of the removal opening.

7. The slide bearing arrangement according to claim 6, wherein the removal opening, in a circumferential direction, has an oil feed.

8. The slide bearing arrangement according to claim 5, wherein the removal opening is configured so as to widen radially towards the first axial end.

9. The slide bearing arrangement according to claim 1, wherein a slide bearing pad reception ring, which the slide bearing pads are affixed to, is received on the inner ring element.

10. The slide bearing arrangement according to claim 9, wherein the slide bearing pad reception ring is shrunk onto the inner ring element.

11. The slide bearing arrangement according to claim 9, wherein multiple tapped holes are configured in the slide bearing pad reception ring, wherein the tapped holes extend in an axial direction of the slide bearing pad reception ring and serve to receive fastening screws, wherein pass-through holes are configured in the slide bearing pads, wherein through the pass-through holes the fastening screws are plugged in order to clamp the slide bearing pads on the slide bearing pad reception ring by the fastening screws.

12. The slide bearing arrangement according to claim 11, wherein the slide bearing pads have a shoulder on a radially inner face, wherein the shoulder rests against a first axial end of the slide bearing pad reception ring, wherein the pass-through holes are arranged in the region of the shoulder.

13. The slide bearing arrangement according to claim 1, further comprising
a bearing block which receives the outer ring element,
a cover positioned on an axial end of the bearing block, and
wherein a lubricating oil reservoir is integrated in the cover or adjoined to the cover.

14. The slide bearing arrangement according to claim 1, wherein each of the at least two slide bearing pads has a first axial end and a second axial end and a form element is configured on the first axial end, wherein the form element serves to receive a connection element.

15. The slide bearing arrangement according to claim 1, wherein each of the at least two slide bearing pads has a first axial end and a second axial end and a thrust ring segment is arranged on the second axial end.

16. The slide bearing arrangement according to claim 1, wherein spacers are configured on the individual slide bearing pads, so as to space the individual slide bearing pads in relation to one another in a circumferential direction.

17. The slide bearing arrangement according to claim 1, wherein a lubricating oil transport groove is configured on a first circumferential face of the slide bearing pad in the region of the bearing surface.

18. The slide bearing arrangement according to claim 1, wherein a reception for a lifting device is configured on a radially inner face of the slide bearing pad.

19. A nacelle for a wind turbine, the nacelle comprising:
a nacelle housing;
a rotor shaft;
a rotor hub arranged on the rotor shaft;
a rotor bearing arrangement for mounting the rotor shaft on the nacelle housing, wherein the rotor bearing arrangement comprises a slide bearing arrangement according to claim 1.

20. The nacelle according to claim 19, wherein the rotor bearing arrangement comprises a bearing block, in which the outer ring element is received, wherein the bearing block has an axial stop for the outer ring element, wherein the axial stop is configured on an axial end of the bearing block facing away from the rotor hub.

21. The nacelle according to claim 20, wherein the removal opening extends from a first axial end of the outer ring element, wherein the first axial end of the outer ring element is configured on the end of the bearing block facing away from the rotor hub.

22. The nacelle according to claim 21, wherein the axial stop has a recess in the region of the removal opening of the outer ring element, wherein the recess corresponds with the removal opening.

23. A slide bearing arrangement, comprising:
an inner ring element;
an outer ring element; and
at least one slide bearing element, which is arranged between the inner ring element and the outer ring element; and
a slide bearing pad reception ring, wherein multiple tapped holes are configured in the slide bearing pad reception ring,
wherein a bearing surface of the slide bearing element and a mating surface of the outer ring element rest against each other,
wherein the slide bearing element comprises at least two slide bearing pads, and
wherein the individual slide bearing pads each have a bearing surface that is cambered, viewed in an axial direction, in at least one sub-region,
wherein the tapped holes serve to receive fastening screws, wherein pass-through holes are configured in the slide bearing pads, wherein through the pass-through holes the fastening screws are plugged in order to clamp the slide bearing pads on the slide bearing pad reception ring by the fastening screws.

24. A slide bearing arrangement, comprising:
an inner ring element;
an outer ring element; and
at least one slide bearing element, which is arranged between the inner ring element and the outer ring element,
wherein a bearing surface of the slide bearing element and a mating surface of the outer ring element rest against each other,
wherein the slide bearing element comprises at least two slide bearing pads, and wherein the individual slide bearing pads each have a bearing surface that is cambered, viewed in an axial direction, in at least one sub-region,
wherein a lubricating oil transport groove is configured on a first circumferential face of the slide bearing pad in the region of the bearing surface.

25. A method for changing a slide bearing pad of a slide bearing arrangement, comprising the method steps:
providing a removal opening configured in an outer ring element and interrupting a mating surface of the outer ring element that rests against a bearing surface of a slide bearing pad to be changed;
moving the slide bearing pad to be changed to the removal opening;
releasing an axial securing element of the slide bearing pad to be changed;
axially removing the slide bearing pad to be changed through the removal opening;
axially inserting through the removal opening a new slide bearing pad having a bearing surface that is cambered, viewed in an axial direction, in at least one sub-region; and
fixing the new slide bearing pad using the axial securing element.

* * * * *